United States Patent
Sato et al.

(10) Patent No.: US 9,595,081 B2
(45) Date of Patent: *Mar. 14, 2017

(54) IMAGING DEVICE WITH MULTIPLE SAMPLING UNIT AND IMAGING METHOD USING MULTIPLE SAMPLING

(71) Applicant: Panasonic Intellectual Property Management Co., Ltd., Osaka (JP)

(72) Inventors: Satoshi Sato, Kyoto (JP); Takeo Azuma, Kyoto (JP); Jun Ozawa, Nara (JP); Hiroyuki Motoyama, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 22 days.

This patent is subject to a terminal disclaimer.

(21) Appl. No.: 14/626,583

(22) Filed: Feb. 19, 2015

(65) Prior Publication Data

US 2015/0170340 A1   Jun. 18, 2015

Related U.S. Application Data

(63) Continuation of application No. PCT/JP2014/002595, filed on May 16, 2014.

(30) Foreign Application Priority Data

May 29, 2013   (JP) .................................. 2013-112638

(51) Int. Cl.
*H04N 5/335* (2011.01)
*G06T 5/00* (2006.01)
(Continued)

(52) U.S. Cl.
CPC ......... *G06T 5/001* (2013.01); *H04N 5/23229* (2013.01); *H04N 5/347* (2013.01); *H04N 5/37213* (2013.01)

(58) Field of Classification Search
CPC ..................................................... G06T 5/001
See application file for complete search history.

(56) References Cited

U.S. PATENT DOCUMENTS

2009/0278539 A1   11/2009   Beatty
2010/0259662 A1   10/2010   Oike et al.

FOREIGN PATENT DOCUMENTS

JP   09-093560 A   4/1997
JP   2009-268901 A   11/2009
(Continued)

OTHER PUBLICATIONS

Griffin, S.T., et al.: "Compressive Sensing Applied to Homeland Security" SAS 2008, IEEE Sensors Application Symposium, Feb. 12-14, Feb. 12, 2008, pp. 178-181.
(Continued)

*Primary Examiner* — Gary C Vieaux
(74) *Attorney, Agent, or Firm* — McDermott Will & Emery LLP

(57) ABSTRACT

In an imaging device, a multiple sampling unit performs multiple sampling processing on a charge signal of a captured image, and an analog digital conversion unit converts a signal which has undergone multiple sampling processing to a digital signal. In a reconstruction device, an image reconstruction unit performs reconstruction processing on the digital signal transmitted from the imaging device using information regarding multiple sampling processing transmitted from the imaging device, and obtains an image signal.

14 Claims, 19 Drawing Sheets

(51) Int. Cl.
H04N 5/347 (2011.01)
H04N 5/372 (2011.01)
H04N 5/232 (2006.01)

(56) References Cited

FOREIGN PATENT DOCUMENTS

| | | |
|---|---|---|
| JP | 2010-245955 A | 10/2010 |
| JP | 2011-146813 A | 7/2011 |

OTHER PUBLICATIONS

Tanaka, T.: "Mathematics of Compressed Sensing", IEICE Fundamentals Review, vol. 4, No. 1, 2010, pp. 39-47, with partial English translation.
Ma, J.: "Improved Iterative Curvelet Thresholding for Compressed Sensing and Measurement", IEEE Transactions on Instrumentation and Measurement, vol. 60, Iss. 1, 2011, pp. 126-136.
Ibaraki, T., et al.: "Technique of Optimization", Information Mathematics Course, vol. 14, Kyoritsu Shippan Co., Ltd., Jul. 20, 1993, pp. 159-164, with partial English translation.
Takhar, D., et al.: "A New Compressive Imaging Camera Architecture using Optical-Domain Compression", Proc. of Computational Imaging IV at SPIE Electronic Imaging, 2006, 10 pages.
Oike, Y., et al.: "A 256×256 CMOS Image Sensor with ΔΣ-Based Single-Shot Compressed Sensing", IEEE International Solid-State Circuits Conference (ISSCC) Dig. of Tech. Papers, 2012, pp. 386-387.
Nakashizuka, M.: "Sparse Signal Representations and Its Applications to Image and Speech Processing", Journal of the Institute of Image Information and Television Engineers, vol. 2009, No. 23, 2009, pp. 43-48, with partial English translation.
Interantional Search Report issued in PCT/JP2014/002595, dated Jun. 10, 2014, with English translation.

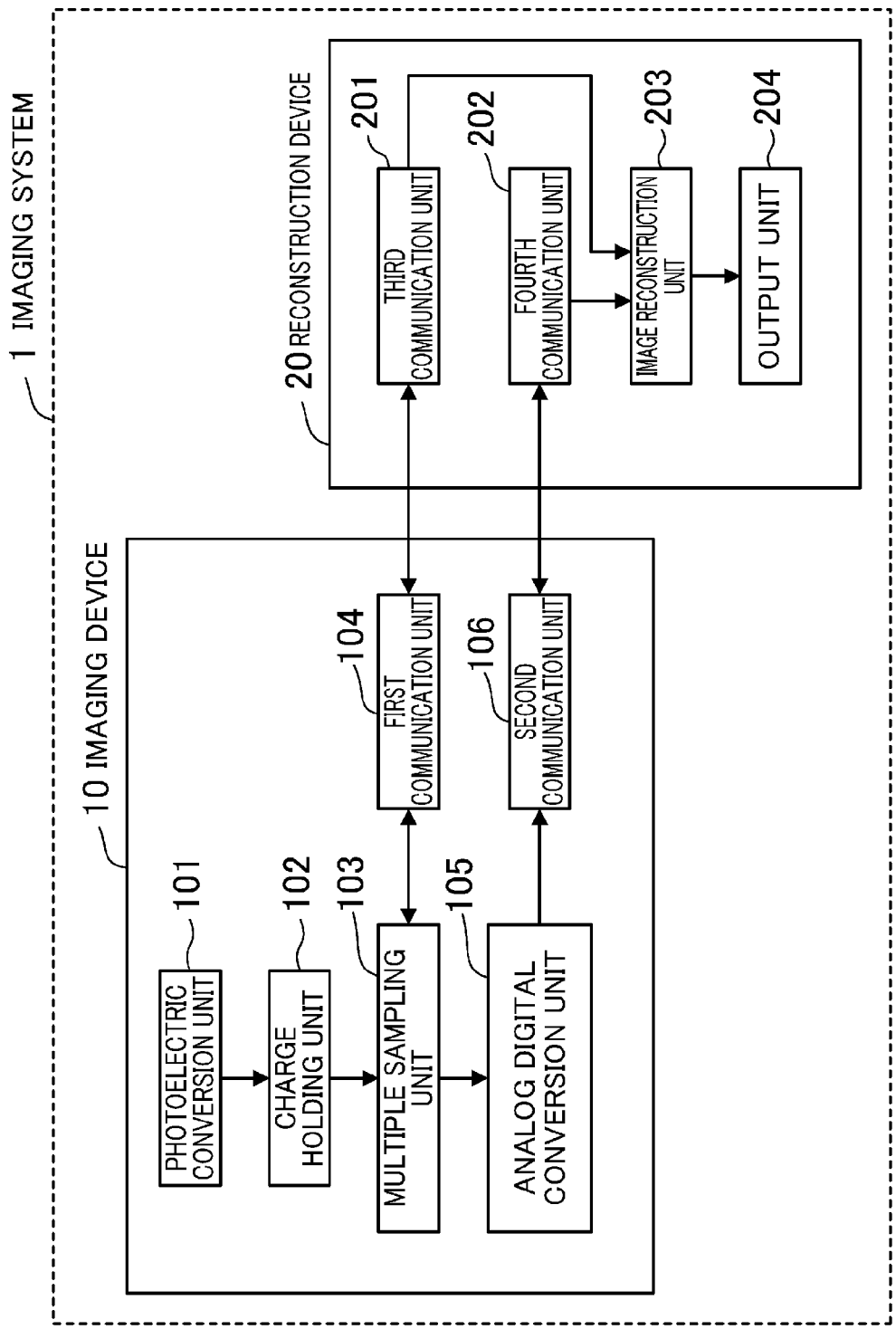

4 × 4 PIXELS
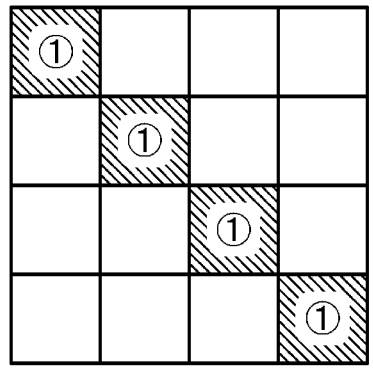
FIG.2A t=1
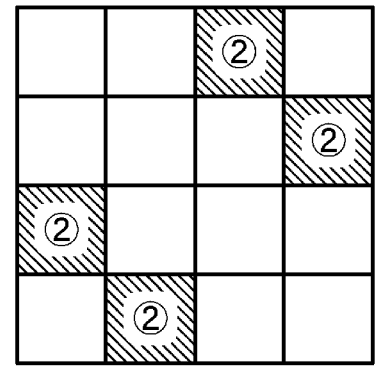
FIG.2B t=2
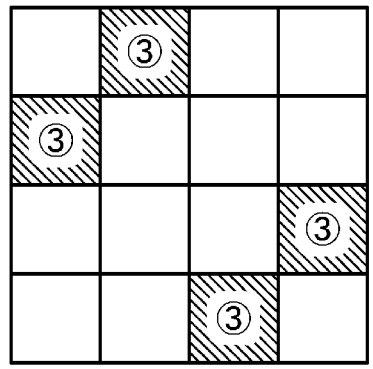
FIG.2C t=3
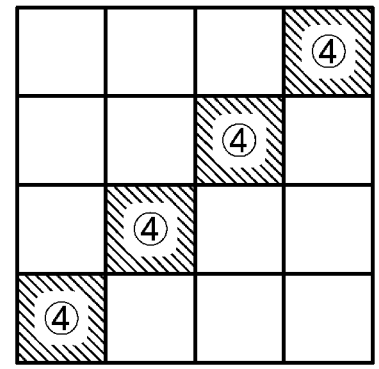
FIG.2D t=4
FIG.3
PIXEL NUMBERS OF 4 × 4 PIXELS
| 1 | 2 | 3 | 4 |
|---|---|---|---|
| 5 | 6 | 7 | 8 |
| 9 | 10 | 11 | 12 |
| 13 | 14 | 15 | 16 |

4 × 4 PIXELS
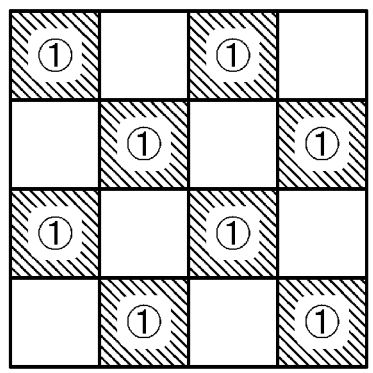
FIG.4A t=1
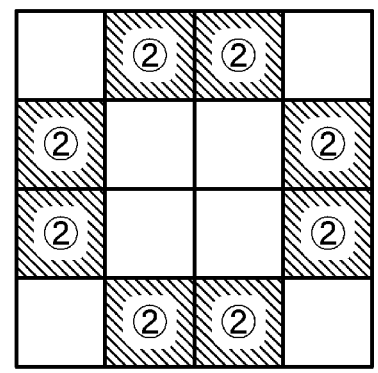
FIG.4B t=2
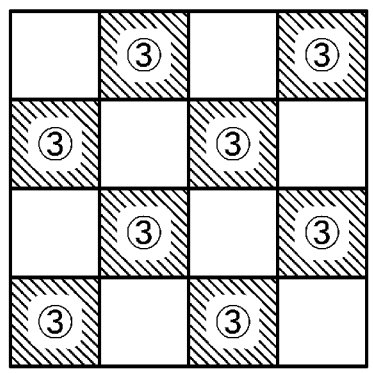
FIG.4C t=3
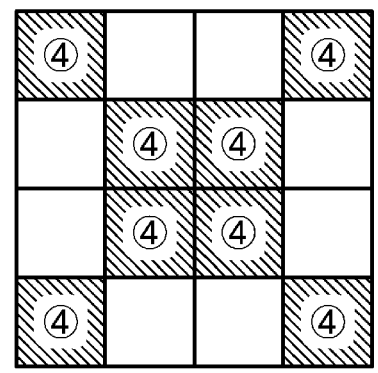
FIG.4D t=4

4 × 4 PIXELS
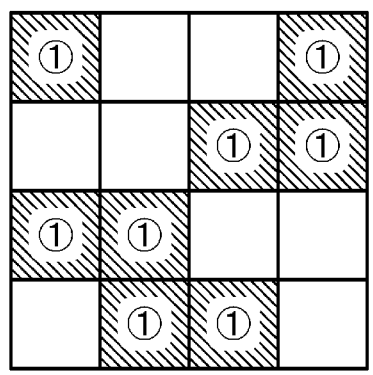
FIG.5A t=1
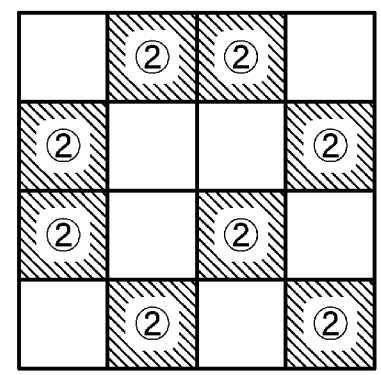
FIG.5B t=2
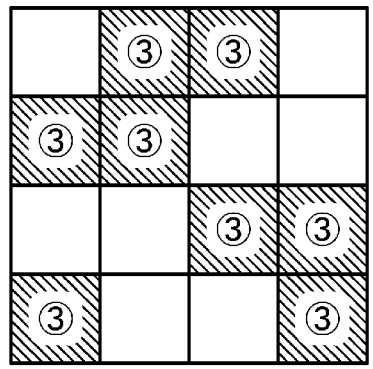
FIG.5C t=3
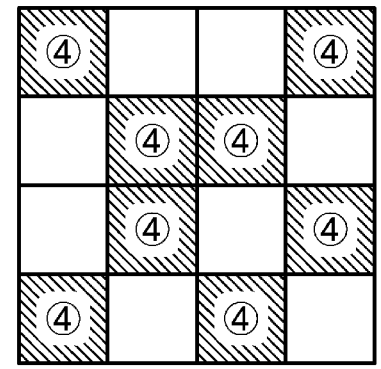
FIG.5D t=4

FIG.6

| TABLE NUMBER | MULTIPLE SAMPLING INFORMATION | | | |
|---|---|---|---|---|
| 1 | 1000 | 0100 | 0010 | 0001 |
|   | 0010 | 0001 | 1000 | 0100 |
|   | 0100 | 1000 | 0001 | 0010 |
|   | 0001 | 0010 | 0100 | 1000 |
| 2 | 1010 | 0101 | 1010 | 0101 |
|   | 0110 | 1001 | 1001 | 0110 |
|   | 0101 | 1010 | 0101 | 1010 |
|   | 1001 | 0110 | 0110 | 1001 |
| 3 | 1001 | 0011 | 1100 | 0110 |
|   | 0110 | 1001 | 1010 | 0101 |
|   | 0110 | 1100 | 0011 | 1001 |
|   | 1001 | 0110 | 0101 | 1010 |

4×4→2×2
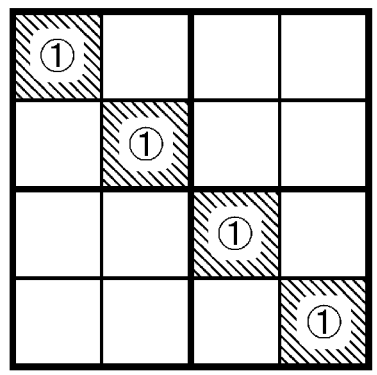
FIG.7A t=1
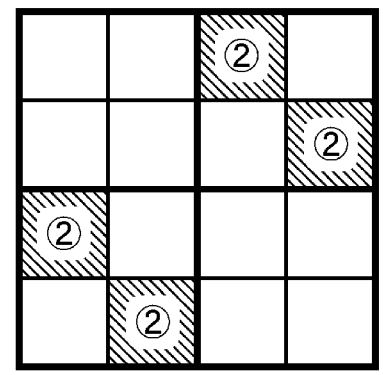
FIG.7B t=2
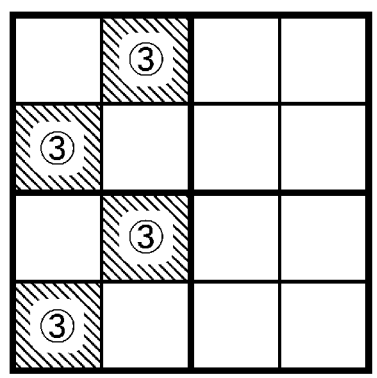
FIG.7C t=3
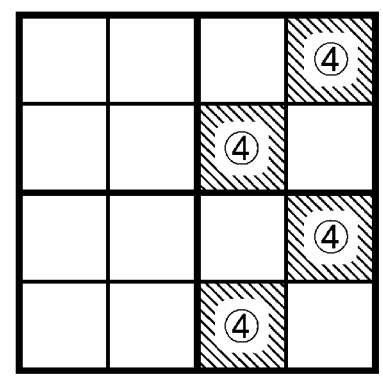
FIG.7D t=4

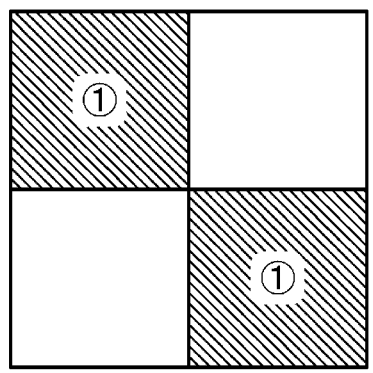
FIG.8A t=1
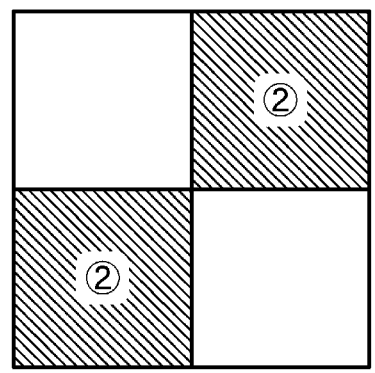
FIG.8B t=2
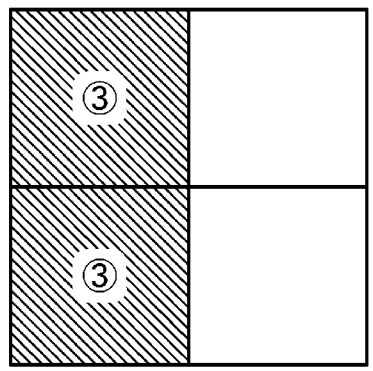
FIG.8C t=3
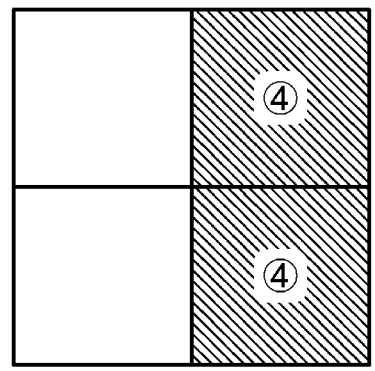
FIG.8D t=4
FIG.9
| TABLE NUMBER | MULTIPLE SAMPLING INFORMATION |
|---|---|
| 4 | 1000  0100  0010  0001<br>0010  0001  1000  0100<br>0100  1000  0100  1000<br>0001  0010  0001  0010 |
| 5 | 1001<br>0110<br>1010<br>0101 |

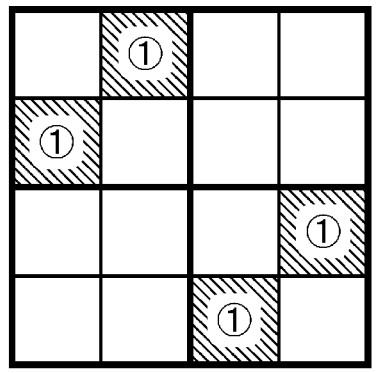
FIG.10A
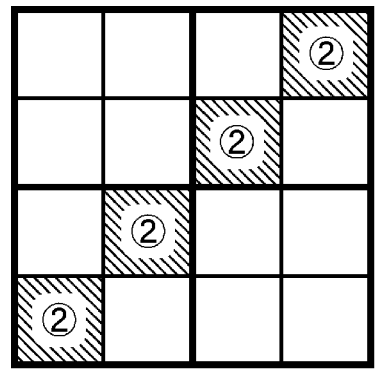
FIG.10B
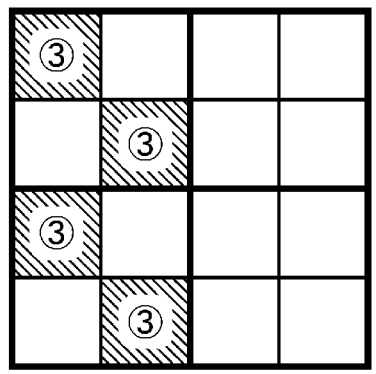
FIG.10C
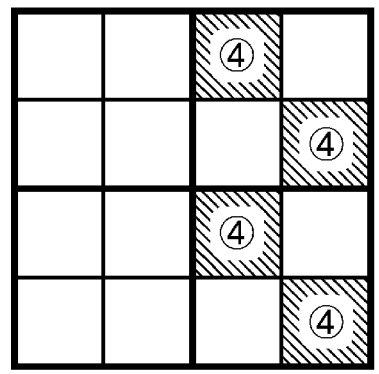
FIG.10D
FIG.11
| TABLE NUMBER | MULTIPLE SAMPLING INFORMATION | | | |
|---|---|---|---|---|
| 6 | 0100 | 1000 | 0001 | 0010 |
|   | 0001 | 0010 | 0100 | 1000 |
|   | 1000 | 0100 | 1000 | 0100 |
|   | 0010 | 0001 | 0010 | 0001 |

SAMPLING MINIMUM UNIT

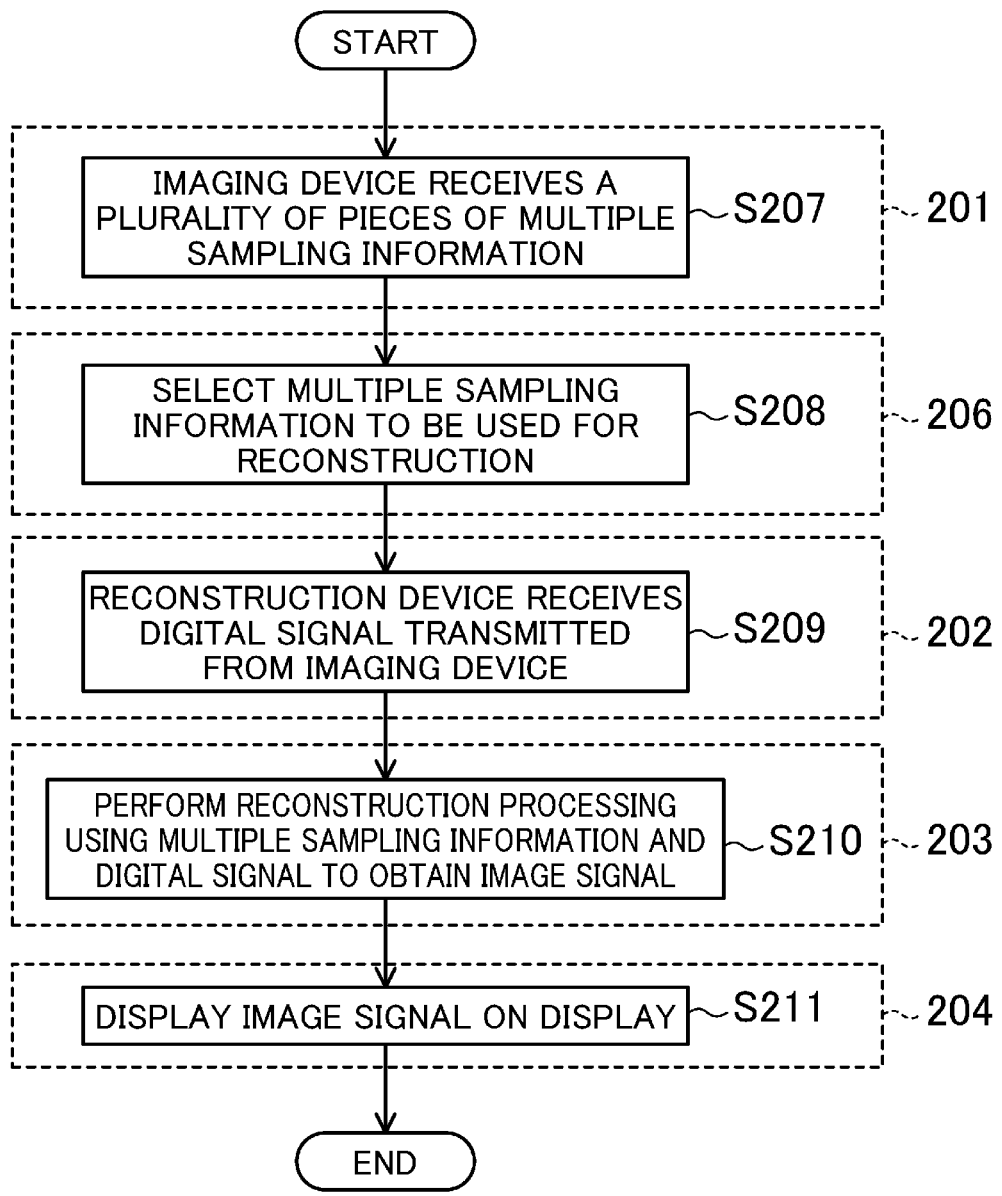

IMAGING DEVICE WITH MULTIPLE SAMPLING UNIT AND IMAGING METHOD USING MULTIPLE SAMPLING

CROSS-REFERENCE TO RELATED APPLICATIONS

This is a continuation of International Application No. PCT/JP2014/002595 filed on May 16, 2014, which claims priority to Japanese Patent Application No. 2013-112638 filed on May 29, 2013. The entire disclosures of these applications are incorporated by reference herein.

BACKGROUND

The present disclosure relates to an imaging system including an imaging device and a reconstruction device configured to reconstruct an image using a signal transmitted from the imaging device.

In recent years, there have been widely spread techniques in which an imaging device is mounted on a household appliance, such as a TV, an air conditioner, a cleaning robot, etc., and at-home sensing is performed by the imaging device. Furthermore, techniques for cloud processing in which an image captured at home is transferred via a network and is processed at a transfer destination have been also widely used.

In recent years, a technique called "compressed sensing" has been also developed. Compressed sensing is a technique in which a plurality of pixel values are added up and thus an image is captured, thereby compressing the image, and image reconstruction using the sparsity of the image is performed, so that image quality is maintained while the amount of data is reduced (see, for example, Toshiyuki Tanaka, "Mathematics of Compressed Sensing," IEICE Fundamentals Review, vol. 4, no. 1, pp. 39-47, 2010). The expression "an image is sparse" herein means a phenomenon in which, when an image is projected onto a wavelet space, a discrete cosine (DCT) space, or the like, many coefficient values are substantially zero. As an image reconstruction method using the sparsity of an image, L0 norm minimization or L1 norm minimization is used in compressed sensing.

Furthermore, a solid-state image sensor has been proposed in which, a technique of compressed sensing is introduced to an image sensor, and thus, a sample and hold circuit is not necessary, and image degradation due to increase in noise, increase in area, and reduction in speed may be reduced (see, for example, Japanese Unexamined Patent Publication No. 2010-245955).

Related art is disclosed, for example, in the following documents: Japanese Unexamined Patent Publication No. 2010-245955; Toshiyuki Tanaka, "Mathematics of Compressed Sensing," IEICE Fundamentals Review, vol. 4, no. 1, pp. 39-47, 2010; J. Ma, "Improved Iterative Curvelet Thresholding for Compressed Sensing and Measurement," IEEE Transactions on Instrumentation and Measurement, Vol. 60, Iss. 1, pp. 126-136, 2011; Toshihide Ibaraki, Masao Fukushima, "Method of Optimization," Information mathematics course, vol. 14, Kyoritsu Shuppan Co., Ltd., pp. 159-164, Jul. 20, 1993, First Edition/First Copy; D. Takhar, J. N. Laska, M. B. Wakin. M. F. Durate, D. Baron, S. Sarvotham, K. F. Kelly, and R. G. Baraniuk, "A New Compressive Imaging Camera Architecture using optical-domain compression," Proc. of Computational Imaging IV at SPIE Electronic Imaging, 2006; Y. Oike and A. E. Gamal, "A 256×256 CMOS Image Sensor with ΔΣ-Based Single-Shot Compressed Sensing," IEEE International Solid-State Circuits Conference (ISSCC) Dig. of Tech. Papers, pp. 386-387, 2012; and Makoto Nakashizuka, "Sparse Signal Representation and Its Image Processing Application," Journal of the Institute of Image Information and Television Engineers, Vol. 65, No. 10, pp. 1381-1386.

An image captured at home is very personal. Therefore, in the above-described at-home sensing technique, high-level privacy protection is required, for example, in the following terms.

(1) Reducing the risk of a captured image being intercepted while the captured image is transmitted.

(2) Reducing the risk of captured image data left in a device being seen by someone else.

Regarding (1), in order to maintain confidentiality in communication, techniques in which an image is encrypted have been widely known, and techniques in which a public key and a secret key are used have been widely spread. On the other hand, regarding (2), for example, if original captured image data is left in a memory of a device, there is a probability that the captured image is seen or copied by someone else after the device has been disposed. In order for this not to happen, for example, a measure in which, when a device is disposed, image data therein is also discarded has to be taken, and technically, there is a still problem remaining.

It is therefore an object of the present disclosure to solve the above-described problem and to provide an imaging system that may capture a desired image such that captured image data is not left in an imaging device using a technique of compressed sensing.

SUMMARY

According to an aspect, in an imaging system including an imaging device and a reconstruction device configured to reconstruct an image using a signal transmitted from the imaging device, the imaging device holds a charge signal of a captured image, performs multiple sampling processing on the held charge signal, converts the signal which has undergone multiple sampling processing to a digital signal, and transmits the digital signal and information regarding multiple sampling processing to the reconstruction device. The reconstruction device receives the information regarding multiple sampling process and the digital signal which have been transmitted from the imaging device performs reconstruction processing on the digital signal using the information regarding multiple sampling processing, obtains an image signal, and outputs a reconstructed image signal.

Thus, in the imaging device, multiple sampling processing is performed on a charge signal of a captured image, and the signal that has undergone multiple sampling processing is converted to a digital signal. In the reconstruction device, reconstruction processing is performed on the digital signal transmitted from the imaging device, using the information regarding multiple sampling processing, which has been transmitted from the imaging device, and an image signal is reconstructed. Accordingly, in the imaging system, only information that has undergone multiple sampling processing is transmitted as a digital signal, and thus, original image data is not left in the imaging device. Therefore, the imaging system that is excellent in privacy protection may be realized.

According to the present disclosure, an image may be reconstructed by a reconstruction device without leaving original image data in an imaging device. Therefore, in an imaging system, excellent privacy protection may be realized.

BRIEF DESCRIPTION OF THE DRAWINGS

FIG. 1 is a block diagram illustrating a configuration of an imaging system according to a first embodiment.

FIGS. 2A to 2D are pattern diagrams illustrating an example of adding processing.

FIG. 3 is a pattern diagram illustrating pixel numbers.

FIGS. 4A to 4D are pattern diagrams illustrating an example of multiple sampling processing.

FIGS. 5A to 5D are pattern diagrams illustrating an example of multiple sampling processing.

FIG. 6 is a pattern diagram illustrating an example of multiple sampling information.

FIGS. 7A to 7D are pattern diagrams illustrating an example of multiple sampling processing.

FIGS. 8A to 8D are pattern diagrams illustrating reconstruction processing in which the resolution of an image that is to be reconstructed is changed, relative to the multiple sampling processing illustrated in FIGS. 7A to 7D.

FIG. 9 is a pattern diagram illustrating an example of multiple sampling information corresponding to FIGS. 7A to 7D and FIGS. 8A to 8D.

FIGS. 10A to 10D are pattern diagrams illustrating reconstruction processing in which the resolution of an image that is to be reconstructed is changed, relative to the multiple sampling processing illustrated in FIGS. 7A to 7D.

FIG. 11 is a pattern diagram illustrating an example of multiple sampling information corresponding to FIGS. 10A to 10D.

FIG. 22 is a flow chart illustrating an example of processing of a reconstruction device in the configuration of FIG. 21.

DETAILED DESCRIPTION

Figure 12:
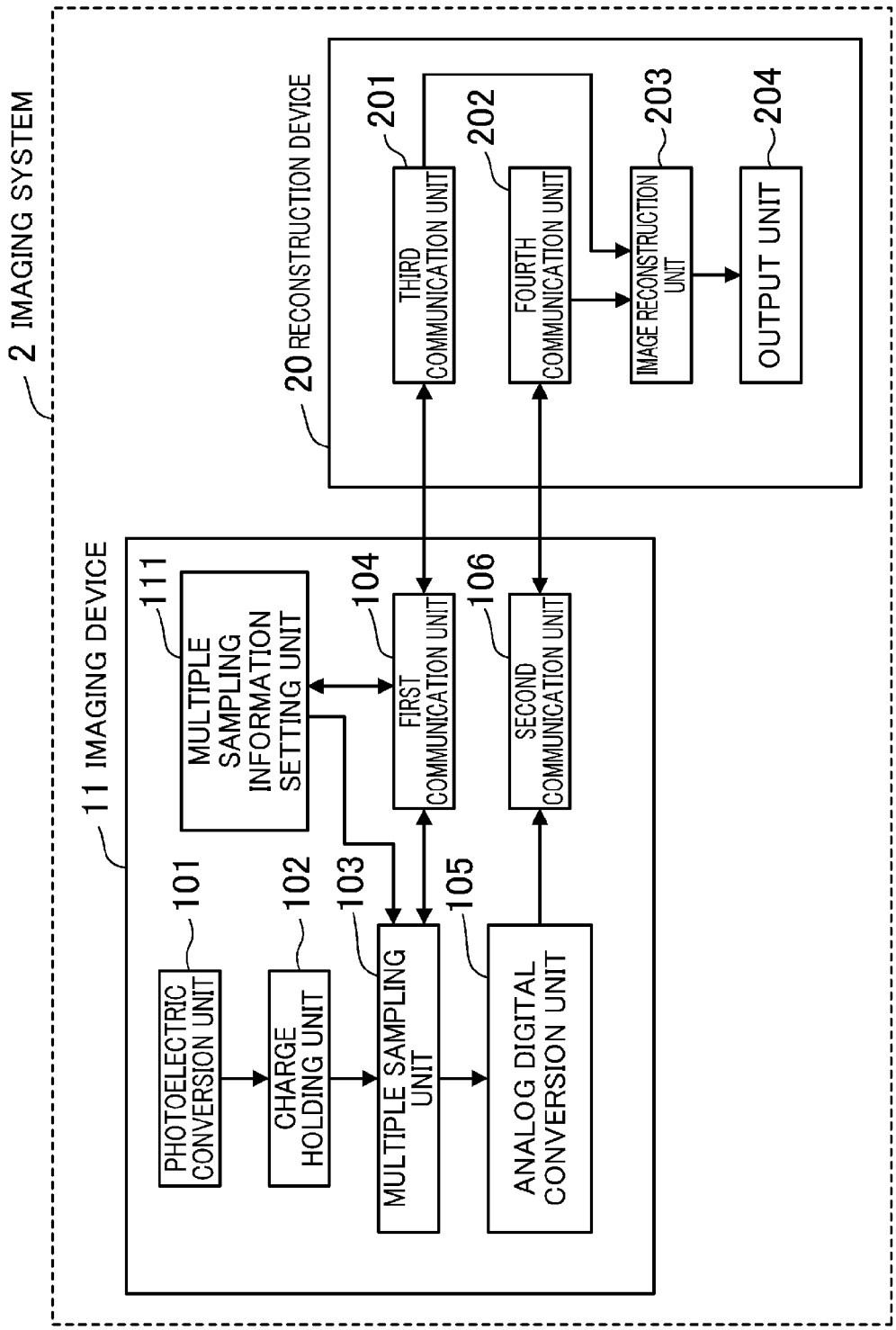
FIG. 12 is a block diagram illustrating a configuration of an imaging system according to a second embodiment.
Figure 13A:
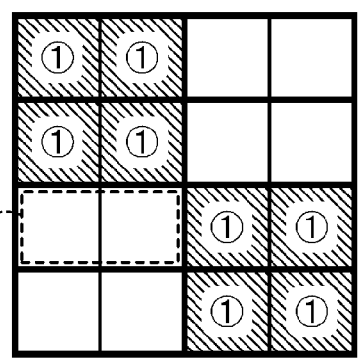
FIGS. 13A to 13D are pattern diagrams illustrating the operation of a multiple sampling information setting unit.
Figure 13B:
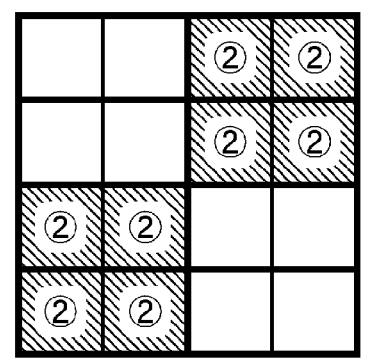
Figure 13C:
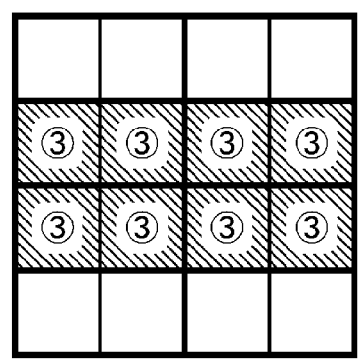
Figure 13D:
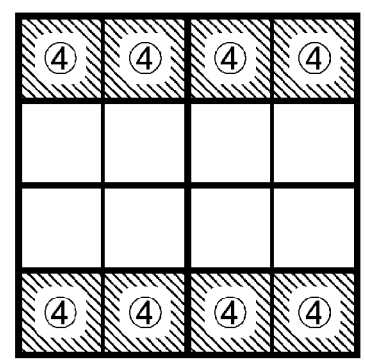
Figure 14A:
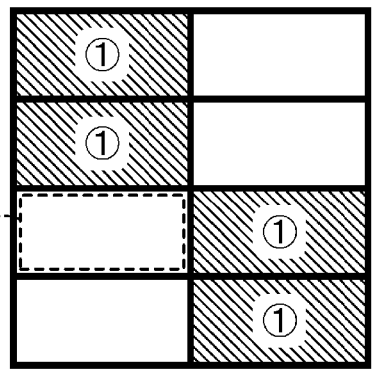
FIGS. 14A to 14D are pattern diagrams illustrating the operation of the multiple sampling information setting unit.
Figure 14B:
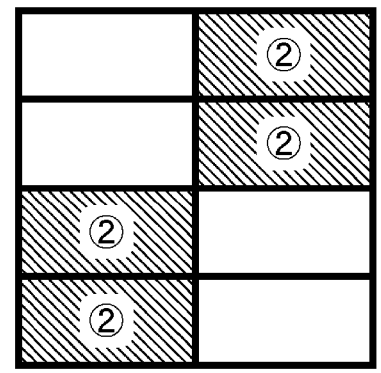
Figure 14C:
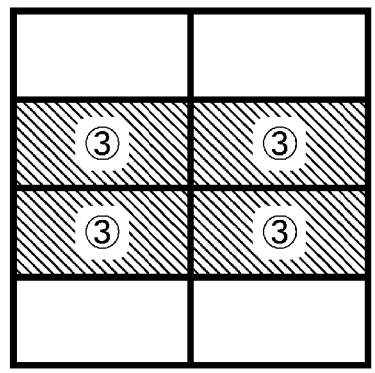
Figure 14D:
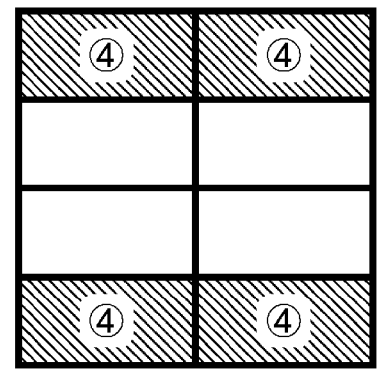

According to a first aspect, an imaging device includes a photoelectric conversion unit configured to convert optical signals received by a plurality of pixels to electrical signals, a charge holding unit configured to accumulate the electrical signals obtained by the photoelectric conversion unit and hold the accumulated signals as charge signals, a multiple sampling unit configured to perform multiple sampling processing on the electrical signals held by the charge holding unit, an analog digital conversion unit configured to convert an output signal of the multiple sampling unit to a digital signal, and an imaging-side communication unit configured to transmit information regarding multiple sampling processing that is executed by the multiple sampling unit and the digital signal output from the analog digital conversion unit.

According to a second aspect, in the imaging device according to the first aspect, as the information regarding multiple sampling processing, multiple sampling information which is information indicating a sampling pixel position is transmitted.

According to a third aspect, in the imaging device according to the second aspect, the multiple sampling information is information indicating multiple sampling processing that is executed by the multiple sampling unit.

According to a fourth aspect, in the imaging device according to the second aspect, the multiple sampling information is information newly generated from information indicating multiple sampling processing that is executed by the multiple sampling unit such that an image signal having a lower resolution is obtained by reconstruction processing.

According to a fifth aspect, in the imaging device according to the fourth aspect, the multiple sampling information is information obtained by performing sampling position change on the information indicating multiple sampling processing that is executed by the multiple sampling unit.

According to a sixth aspect, in the imaging device according to the fourth aspect, a plurality of types of the multiple sampling information, which correspond to different resolutions, are generated and are transmitted.

According to a seventh aspect, in the imaging device according to the first aspect, the imaging device and a reconstruction device configured to reconstruct an image using a signal transmitted from the imaging device store common pieces of multiple sampling information of a plurality of types, and the imaging device transmits, as information regarding the multiple sampling processing, information that specifies one of the pieces of multiple sampling information of a plurality of types to the reconstruction device.

According to an eighth aspect, the imaging device according to the first aspect includes a setting unit configured to set multiple sampling information, and the multiple sampling unit performs multiple sampling processing in accordance with the multiple sampling information set by the setting unit.

According to a ninth aspect, a reconstruction device which performs image reconstruction using a signal transmitted from the imaging device according to the first aspect includes a reconstruction-side communication unit configured to receive information regarding the multiple sampling processing and the digital signal which are transmitted from the imaging-side communication unit of the imaging device, an image reconstruction unit configured to perform reconstruction processing on the digital signal received by the reconstruction-side communication unit using the information regarding the multiple sampling processing received by the reconstruction-side communication unit, and obtain an image signal, and an output unit configured to output the image signal reconstructed by the image reconstruction unit.

According to a tenth aspect, in an imaging system including an imaging device and a reconstruction device configured to reconstruct an image using a signal transmitted from the imaging device, the imaging device includes a photoelectric conversion unit configured to convert optical signals received by a plurality of pixels to electrical signals, a charge holding unit configured to accumulate the electrical signals obtained by the photoelectric conversion unit and hold the accumulated signals as charge signals, a multiple sampling unit configured to perform multiple sampling processing on the electrical signals held by the charge holding unit, an analog digital conversion unit configured to convert an output signal of the multiple sampling unit to a digital signal, and an imaging-side communication unit configured to transmit information regarding multiple sampling processing that is executed by the multiple sampling unit and the digital signal output from the analog digital conversion unit, and the reconstruction device includes a reconstruction-side communication unit configured to receive information regarding the multiple sampling processing and the digital signal which are transmitted from the imaging-side communication unit of the imaging device, an image reconstruction unit configured to perform reconstruction processing on the digital signal received by the reconstruction-side communication unit using the information regarding the multiple sampling processing received by the reconstruction-side communication unit, and obtain an image signal, and an output unit configured to output the image signal reconstructed by the image reconstruction unit.

According to an eleventh aspect, in the imaging system according to the tenth aspect, the reconstruction device includes a setting unit configured to set multiple sampling information, the reconstruction-side communication unit is configured to transmit the multiple sampling information set by the setting unit to the imaging device, in the imaging device, the imaging-side communication unit receives the multiple sampling information transmitted from the reconstruction-side communication unit of the reconstruction device, and the multiple sampling unit performs multiple sampling processing in accordance with the multiple sampling information received by the imaging-side communication unit.

According to a twelfth aspect, in the imaging system according to the tenth aspect, the imaging system includes a plurality of the reconstruction devices, the imaging device generates a plurality of pieces of multiple sampling information that is information indicating a sampling image position from information indicating multiple sampling processing that is executed by the multiple sampling unit, and transmits, as the information regarding multiple sampling processing, at least one of the plurality of pieces of multiple sampling information, which have been generated, to each of the plurality of the reconstruction devices.

According to a thirteenth aspect, in the imaging system according to the tenth aspect, the imaging device generates a plurality of pieces of multiple sampling information that is information indicating a sampling image position from information indicating multiple sampling processing that is executed by the multiple sampling unit, and transmits, as the information regarding multiple sampling processing, the plurality of pieces of multiple sampling information, which have been generated, to the reconstruction devices, and the reconstruction device selects one of the plurality of pieces of multiple sampling information, which have been received, and performs reconstruction processing using the selected multiple sampling information.

According to a fourteenth aspect, in an imaging method performed in an imaging system including an imaging device and a reconstruction device which performs image reconstruction using a signal transmitted from the imaging device, the imaging device holds a charge signal of a captured image, performs multiple sampling processing on the held charge signal, converts a signal that has undergone the multiple sampling processing to a digital signal, transmits information regarding the multiple sampling processing and the digital signal to the reconstruction device, and the reconstruction device receives the information regarding the multiple sampling processing and the digital signal which are transmitted from the imaging device, performs reconstruction processing on the digital signal using the information regarding the multiple sampling processing to obtain an image signal, and outputs the reconstructed image signal.

Embodiments will be described below with reference to the accompanying drawings.

(First Embodiment)

FIG. 1 is a block diagram illustrating a configuration of an imaging system according to a first embodiment. An imaging system 1 includes an imaging device 10 and a reconstruction device 20 configured to reconstruct an image using a signal transmitted from the imaging device 10. The imaging device 10 includes a photoelectric conversion unit 101, a charge holding unit 102, a multiple sampling unit 103, a first communication unit 104, an analog digital conversion unit 105, and a second communication unit 106. The reconstruction device 20 includes a third communication unit 201, a fourth communication unit 202, an image reconstruction unit 203, and an output unit 204. The first communication unit 104 and the second communication unit 106 together form an imaging-side communication unit, and the third communication unit 201 and the fourth communication unit 202 together form a reconstruction-side communication unit.

First, the imaging device 10 will be described.

The photoelectric conversion unit 101 includes a plurality of pixels, and each of the pixels converts a received optical signal to an electrical signal. The plurality of pixels are realized, for example, by arranging photoelectric conversion elements, such as photo diodes, etc. in a two-dimensional manner. The charge holding unit 102 accumulates electrical signals obtained by the photoelectric conversion unit 101 for a certain amount of time and holds the accumulated signals as charge signals.

The multiple sampling unit 103 performs multiple sampling processing on charge signals of the plurality of pixels, which are held by the charge holding unit 102, and generates a new output signal. Multiple sampling information that is an example of information regarding multiple sampling processing indicating processing that is executed by the multiple sampling unit 103 is transmitted to the reconstruction device 20 by the first communication unit 104. Multiple sampling processing used herein means processing in which a signal of a pixel located in a predetermined position is sampled from the original charge signals, the sampled signals are added up, and a new signal is generated. The multiple sampling information includes information indicating the position of a pixel, the signal of which has been sampled for use in adding in the original charge signal, for each of the signal values of new output signals that have undergone multiple sampling processing. Note that, when a gain is given at the time of adding, as will be described below, the multiple sampling information may include information of the given gain.

The multiple sampling unit 103 performs multiple sampling processing, and thereby, compression of image information is enabled, so that the signal amount for signals that are to be transmitted to the reconstruction device 20 may be reduced. The reconstruction device 20 may reconstruct an image from compressed image information using received multiple sampling information.

FIGS. 2A-2D are pattern diagrams illustrating multiple sampling processing. For the sake of simplifying the description, processing with 4×4 pixels, that is, 16 pixels, will be described as an example. FIGS. 2A-2D illustrate readout pixels, that is, pixels used in multiple sampling processing, where t=1 to 4. Also, for the purpose of illustration, pixel numbers are given to 4×4 pixels in FIG. 3. That is, in 4×4 pixels, "1," "2," "3," and "4" are given in this order to the pixels arranged from the upper left corner in the direction toward the light, and similarly, "5," "6," . . . are given to the pixels arranged from the left end in the next row, and "16" is given to the pixel arranged in the lower right corner.

In FIG. 2A, data of pixels with the pixel numbers 1, 6, 11, and 16 is read out and the data of the four pixels is subjected to adding processing, thereby generating an output signal of t=1. Similarly, in FIG. 2B, data of pixels with the pixel numbers 3, 8, 9, and 14 is read out and the data of the four pixels is added up, thereby generating an output signal of t=2. In FIG. 2C, data of pixels with the pixel numbers 2, 5, 12, and 15 is read out and the data of the four pixels is added up, thereby generating an output signal of t=3. In FIG. 2D, data of pixels with the pixel numbers 4, 7, 10, and 13 is read out and the data of the four pixels is added up, thereby generating an output signal of t=4.

In the above described manner, data of 4×4 =16 pixels is compressed to four pieces of data of t=1 to 4. Thus, the operation speed of the analog digital conversion unit 105, which will be described later, may be reduced, so that an image with low noise may be reconstructed.

In the multiple sampling processing of FIGS. 2A to 2D, multiple sampling information is, for example, as follows. As for t=1 to 4, given that a pixel sampled for adding is denoted by "1" and a pixel which is not sampled is denoted by "0," data coded in the order of the pixel numbers illustrated in FIG. 3 is the multiple sampling information. That is, when t=1, "1000 0100 0010 0001,"
when t=2, "0010 0001 1000 0100,"
when t=3, "0100 1000 0001 0010," and
when t=4, "0001 0010 0100 1000,"

and therefore, these are joined together to obtain the multiple sampling information, that is, "1000 0100 0010 0001 0010 0001 1000 0100 0100 1000 0001 0010 0001 0010 0100 1000."

Note that the format of multiple sampling information is not limited to one illustrated herein, but any format in which the position of a pixel sampled for use in adding is indicated may be used.

The analog digital conversion unit 105 converts a signal generated in the multiple sampling unit 103 to a digital signal. This processing may be executed using a pipeline type or column type analog digital converter, which is widely known.

The second communication unit 106 transmits a digital signal converted by the analog digital conversion unit 105 to the reconstruction device 20, for example, via a network.

Thus, in the imaging device 10 according to this embodiment, before performing analog-digital conversion processing, charge information of a captured image is multiple sampling processed ant thus is compressed. Therefore, the imaging device 10 has, as a digital signal, only compressed data that has undergone multiple sampling processing, and does not hold data of the original captured image. Even when someone else obtains an output signal of the multiple sampling unit 103, an image may not be reconstructed using the output signal as it stands. Therefore, the imaging device 10 that is excellent in privacy protection may be realized.

Next, the reconstruction device 20 will be described.

The third communication unit 201 receives multiple sampling information transmitted from the first communication unit 104 of the imaging device 10, for example, via a network. The received multiple sampling information is used in the image reconstruction unit 203, which will be described later. The fourth communication unit 202 receives a digital signal transmitted from the second communication unit 106 of the imaging device 10, for example, via a network.

The image reconstruction unit 203 performs reconstruction processing on the digital signal received by the fourth communication unit 202 using the multiple sampling information received by the third communication unit 201, and obtains an image signal. For this reconstruction processing, a known technique, such as an improved iterative curvelet thresholding method (see, for example, J. Ma, "Improved Iterative Curvelet Thresholding for Compressed Sensing and Measurement," IEEE Transactions on Instrumentation and Measurement, Vol. 60, Iss. 1, pp. 126-136, 2011), an affine scaling method (see, for example, Toshihide Ibaraki, Masao Fukushima, "Method of Optimization," Information mathematics course, vol. 14, Kyoritsu Shuppan Co., Ltd., pp. 159-164, Jul. 20, 1993, First Edition/First Copy), etc., which are widely used in compressed sensing, may be used. For reconstruction processing, multiple sampling information is necessary. If multiple sampling information is unknown, it is impossible to obtain captured image information from a compressed digital signal. Therefore, in the imaging device 10, multiple sampling information is handled as a key of an encryption technique, thereby enabling the reconstruction device 20 to reconstruct a correct image, even when an image (a correct answer image) before being compressed is unknown.

The output unit 204 is an interface configured to display an image reconstructed by the image reconstruction unit 203 on a display and to output the image for use in image processing, such as person detection, etc.

In image compression processing, such as JPEG, etc., which is widely known, a correct answer image is needed at the time of compression, and therefore, the correct answer image has to be held on a memory. In the imaging system 1 according to this embodiment, on the other hand, techniques of compressed sensing are used, and thus, compression processing may be performed even when a correct answer image is unknown. Thus, a captured image is not needed to be held in the imaging device 10, and image processing that is excellent in privacy protection may be realized.

Note that in the example of FIGS. 2A to 2D, each pixel is read out once in multiple sampling processing. As a matter of course, in multiple sampling processing, the same pixel may be read out a plurality of times.

FIGS. 4A to 4D are pattern diagrams illustrating an example of the above-described multiple sampling processing. In FIG. 4A, data of pixels with the pixel numbers 1, 3, 6, 8, 9, 11, 14, and 16 is read out and the data of the eight pixels is added up, thereby generating an output signal of t=1. Similarly, in FIG. 4B, data of pixels with the pixel numbers 2, 3, 5, 8, 9, 12, 14, and 15 is read out and the data of the eight pixels is added up, thereby generating an output signal of t=2. In FIG. 4C, data of pixels with the pixel numbers 2, 4, 5, 7, 10, 12, 13, and 15 is read out and the data of the eight pixels is added up, thereby generating an output signal of t=3. In FIG. 4D, data of pixels with the pixel numbers 1, 4, 6, 7, 10, 11, 13, and 16 is read out and the data of the eight pixels is added up, thereby generating an output signal of t=4.

In the above described manner, the dynamic range of an output signal may be increased by reading out each pixel a plurality of numbers of times and performing adding processing, and therefore, noise may be reduced. Such multiple sampling processing is described, for example, in D. Takhar, J. N. Laska, M. B. Wakin. M. F. Durate, D. Baron, S. Sarvotham, K. F. Kelly, and R. G. Baraniuk, "A New Compressive Imaging Camera Architecture using optical-domain compression," Proc. of Computational Imaging IV at SPIE Electronic Imaging, 2006, and Y. Oike and A. E. Gamal, "A 256×256 CMOS Image Sensor with ΔΣ-Based Single-Shot Compressed Sensing," IEEE International Solid-State Circuits Conference (ISSCC) Dig. of Tech. Papers, pp. 386-387, 2012.

In multiple sampling processing, a pixel position where sampling is performed may be selected at random and/or independently. Thus, degradation of image information due to sampling processing may be reduced, and the image quality of a reconstruction image may be improved (see, for example, pp. 43-44 of Toshiyuki TANAKA, "Mathematics of Compressed Sensing," IEICE Fundamentals Review, vol. 4, no. 1, pp. 39-47, 2010).

FIGS. 5A to 5D are pattern diagrams illustrating an example of multiple sampling processing in which a pixel position where sampling is performed is selected at random. In FIG. 5A, data of pixels with the pixel numbers 1, 4, 7, 8, 9, 10, 14 and 15 is read out and the data of the eight pixels is added up, thereby generating an output signal of t=1. Similarly, in FIG. 5B, data of pixels with the pixel numbers 2, 3, 5, 8, 9, 11, 14 and 16 is read out and the data of the eight pixels is added up, thereby generating an output signal of t=2. In FIG. 5C, data of pixels with the pixel numbers 2, 3, 5, 6, 11, 12, 13 and 16 is read out and the data of the eight pixels is added up, thereby generating an output signal of t=3. In FIG. 5D, data of pixels with the pixel numbers 1, 4, 6, 7, 10, 12, 13 and 15 is read out and the data of the eight pixels is added up, thereby generating an output signal of t=4.

Also, in multiple sampling processing, a gain may be given and be subjected to weighing and adding, instead of merely adding up a plurality of pieces of pixel data. When a plurality of pieces of pixel data are added up, the dynamic range of data after adding has been performed increases, and the load of the analog digital conversion unit 105 increases. In order to solve this problem, it is effective to perform weighing and adding on pixel data. For example, when multiple sampling processing illustrated in FIGS. 2A to 2D is performed, in order to cause the dynamic range of data after adding has been performed to match that of original pixel data, as normalization processing, a weight ¼ may be given as a gain.

Each of the imaging device 10 and the reconstruction device 20 may be configured to store common pieces of multiple sampling information of a plurality of types, and the imaging device 10 may be configured to transmit information that specifies one of the shared pieces of sampling information of a plurality of types, as an example of information regarding multiple sampling processing, to the reconstruction device 20. Thus, the amount of communication may be greatly reduced.

FIG. 6 is a pattern diagram illustrating an example of multiple sampling information, as an example of the pieces of multiple sampling information of a plurality of types, which are shared by the imaging device 10 and the reconstruction device 20. Table numbers 1, 2, and 3 in FIG. 6 correspond to the multiple sampling processing of FIGS. 2A to 2D, the multiple sampling processing of FIGS. 4A to 4D, and the multiple sampling processing of FIGS. 5A to 5D, respectively. For example, in the imaging device 10, when the multiple sampling unit 103 performs the multiple sampling processing of FIGS. 2A to 2D, the table number "1" is transmitted to the reconstruction device 20. The reconstruction device 20 reads out multiple sampling information of the table number "1" with reference to the table of FIG. 6, and performs image reconstruction corresponding to the multiple sampling processing of FIGS. 2A to 2D. Thus, a correct image may be reconstructed.

Note that, in communication between the first communication unit 104 and the third communication unit 201, an encryption technique may be used to perform secure communication. As such known encryption techniques, techniques using a common key and a public key are well known. As a reconstruction technique, a known technique, such as a matching pursuits method, a matching pursuit denoising method, may be used (see, for example, Makoto Nnakashizuka, "Sparse Signal Representation and Its Image Processing Application," Journal of the Institute of Image Information and Television Engineers, Vol. 65, No. 10, pp. 1381-1386).

Also, in the imaging device 10, the first communication unit 104 and the second communication unit 106 may be realized using the same communication unit. Similarly, in the reconstruction device 20, the third communication unit 201 and the fourth communication unit 202 may be realized using the same communication unit.

As described above, according to this embodiment, multiple sampling processing is performed before analog digital conversion is performed in the imaging device 10, and the multiple sampling information is transmitted to the reconstruction device 20. Thus, a correct image may be stored in the reconstruction device 20 without leaving a captured image in the imaging device 10. Thus, the imaging system 1 that is excellent in privacy protection may be realized.

Note that, in the above-described embodiment, multiple sampling information transmitted from the imaging device 10 indicates multiple sampling processing that is executed by the multiple sampling unit 103. In contrast to this, multiple sampling information may be divided into two, that is, at-imaging multiple sampling information that is used by the multiple sampling unit 103, and at-reconstructing multiple sampling information that is used by the image reconstruction unit 203. That is, multiple sampling information for reconstruction may be newly generated from information indicating multiple sampling processing that is executed by the multiple sampling unit 103, and may be transmitted from the imaging device 10. In executing reconstruction, different multiple sampling information from multiple sampling information used in imaging is used, and thus, for example, the resolution of an image that is to be reconstructed may be changed.

FIGS. 7A to 7D are pattern diagrams illustrating an example of multiple sampling processing, and FIGS. 8A to 8D are pattern diagrams illustrating reconstruction processing in which the resolution of an image that is to be reconstructed is reduced, relative to the multiple sampling processing illustrated in FIGS. 7A to 7D. Also, FIG. 9 is a pattern diagram illustrating an example of multiple sampling information, a table number "4" corresponds to FIGS. 7A to 7D, and a table number "5" corresponds to FIGS. 8A to 8D.

Now, assume that the multiple sampling unit 103 of the imaging device 10 has performed multiple sampling processing of FIGS. 7A to 7D. Then, when the imaging device 10 transmits multiple sampling information of the table number "4" to the reconstruction device 20, the image reconstruction unit 203 of the reconstruction device 20 uses multiple sampling information that accurately indicates at-imaging multiple sampling processing, and therefore, an image having a resolution of 4×4 may be accurately reconstructed. On the other hand, when the imaging device 10 transmits multiple sampling information of the table number "5" to the reconstruction device 20, the image reconstruction unit 203 of the reconstruction device 20 reconstructs a 2×2 pixel image, which is a low resolution image. Note that multiple sampling information for reconstructing a low resolution image may be created, for example, by reducing the resolution of the at-imaging multiple sampling information.

Also, the at-reconstructing multiple sampling information for performing reconstruction processing at a low resolution may also be created by changing (shuffling) a sampling position of the at-imaging multiple sampling information.

FIGS. 10A to 10D are pattern diagrams illustrating example in which the resolution of an image that is to be reconstructed is reduced, relative to the multiple sampling processing illustrated in FIGS. 7A to 7D. FIG. 11 is a pattern diagram illustrating an example of multiple sampling information, and a table number "6" corresponds to FIGS. 10A to 10D. In each of FIGS. 10A to 10D, the sampling position is changed from that in the corresponding one of FIGS. 7A to 7D in a range in units of 2×2 pixels, divided by heavy lines. When reconstruction processing of FIGS. 10A to 10D is performed in accordance with multiple sampling processing of FIGS. 7A to 7D, a pixel value at which the sampling position has been changed is switched to another, and consequently, a reconstructable resolution is up to only a resolution corresponding to a size of 2×2 pixels. That is, when the imaging device 10 transmits multiple sampling information of the table number "6" to the reconstruction device 20, the image reconstruction unit 203 of the reconstruction device 20 reconstructs a low resolution image.

Multiple sampling information that is used by the multiple sampling unit 103 may be changed for each imaging device. Thus, even when someone else obtains a digital signal output from the imaging device, the person does not easily know multiple sampling information, and thus, cannot perform reconstruction processing.

(Second Embodiment)

FIG. 12 is a block diagram illustrating a configuration of an imaging system according to a second embodiment. In FIG. 12, each component element common to FIG. 1 is denoted by the same reference character as that used in FIG. 1, and the detailed description will be omitted.

An imaging system 2 includes an imaging device 11 and the reconstruction device 20 configured to reconstruct an image using a signal transmitted from the imaging device 11. The imaging device 11 includes, in addition to the component elements of the imaging device 10 of FIG. 1, a multiple sampling information setting unit 111.

The multiple sampling information setting unit 111 sets multiple sampling information that is used by the multiple sampling unit 103. As described above, depending on multiple sampling information, the resolution of an image that is to be reconstructed by the image reconstruction unit 203 of the reconstruction device 20 varies. Therefore, the multiple sampling information setting unit 111 sets multiple sampling information such that an image is reconstructed at a resolution desired by a user. Thus, for example, it is possible to reconstruct a low resolution image when the user does not want to capture an image at a high resolution, and to reconstruct a high resolution image when the user wants to capture an image at a high resolution.

The multiple sampling information setting unit 111 receives, for example, a designation of a desired resolution from a user. As an interface in this case, for example, a button, a touch panel, etc., may be used. The multiple sampling information setting unit 111 generates multiple sampling information in accordance with the designated resolution and gives the generated multiple sampling information to the multiple sampling unit 103. In this case, the multiple sampling information setting unit 111 may hold, for example, a table indicating the corresponding relationship between a reconstructable resolution and multiple sampling information in advance. The multiple sampling unit 103 executes multiple sampling processing on the basis of the given multiple sampling information.

Also, the multiple sampling information setting unit 111 may be configured such that a resolution is not directly input by a user but is set, for example, in accordance with a life scene. For example, a resolution is set to be a "high resolution" when the user is "active," an "intermediate resolution" when the user is "absent from home," and a "low resolution" when the user is "asleep." Regarding an input of the life scene, for example, buttons of "active," "absent from home," and "asleep" may be installed in the imaging device 11 such that a user operates the buttons to execute the input. As another alternative, the life scene may be comprehended by performing image recognition processing using an image reconstructed by the reconstruction device 20.

FIGS. 13A to 13D and FIGS. 14A to 14D are pattern diagrams illustrating examples of multiple sampling information processing performed in reducing the resolution. When a user performs setting for reducing the resolution of a reconstruction image on the multiple sampling information setting unit 111, the multiple sampling information setting unit 111 sets, for example, multiple sampling information, as illustrated in FIGS. 13A to 13D. In FIGS. 13A to 13D, a sampling minimum unit is 2×1 pixels. In this case, the image reconstruction unit 203, as illustrated in FIGS. 14A to 14D, may reconstruct only an image in units of 2×1 pixels, which is the minimum sampling unit. Thus, the resolution of a reconstruction image is reduced.

Figure 15:
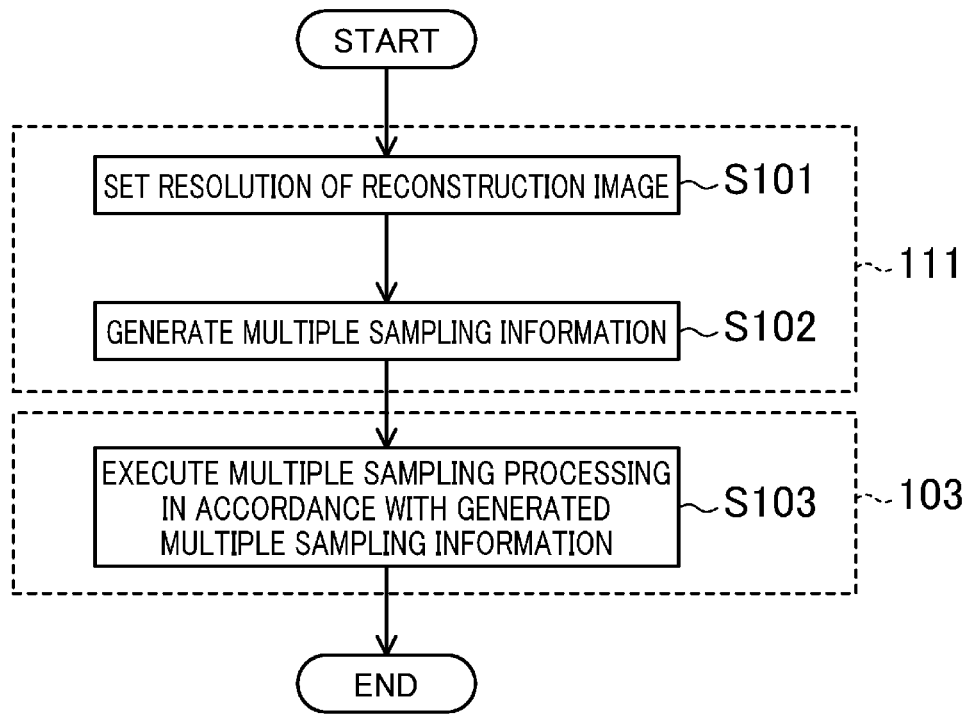
FIG. 15 is a flow chart illustrating an example of multiple sampling information setting processing performed in the configuration of FIG. 12.

FIG. 15 is a flow chart illustrating an example of multiple sampling information setting processing performed in the imaging system 2 of FIG. 12.

In Step S101, a user sets a desired resolution of a reconstruction image via the multiple sampling information setting unit 111. This setting may be performed, for example, by the user's operation of the resolution buttons provided on the imaging device 11.

In Step S102, the multiple sampling information setting unit 111 generates multiple sampling information that is reconstructable at a desired resolution.

In Step S103, the multiple sampling unit 103 performs multiple sampling processing in accordance with the multiple sampling information set by the multiple sampling information setting unit 111.

The above-described processing enables the imaging system 2 to reconstruct an image at a resolution desired by the user.

Figure 16:
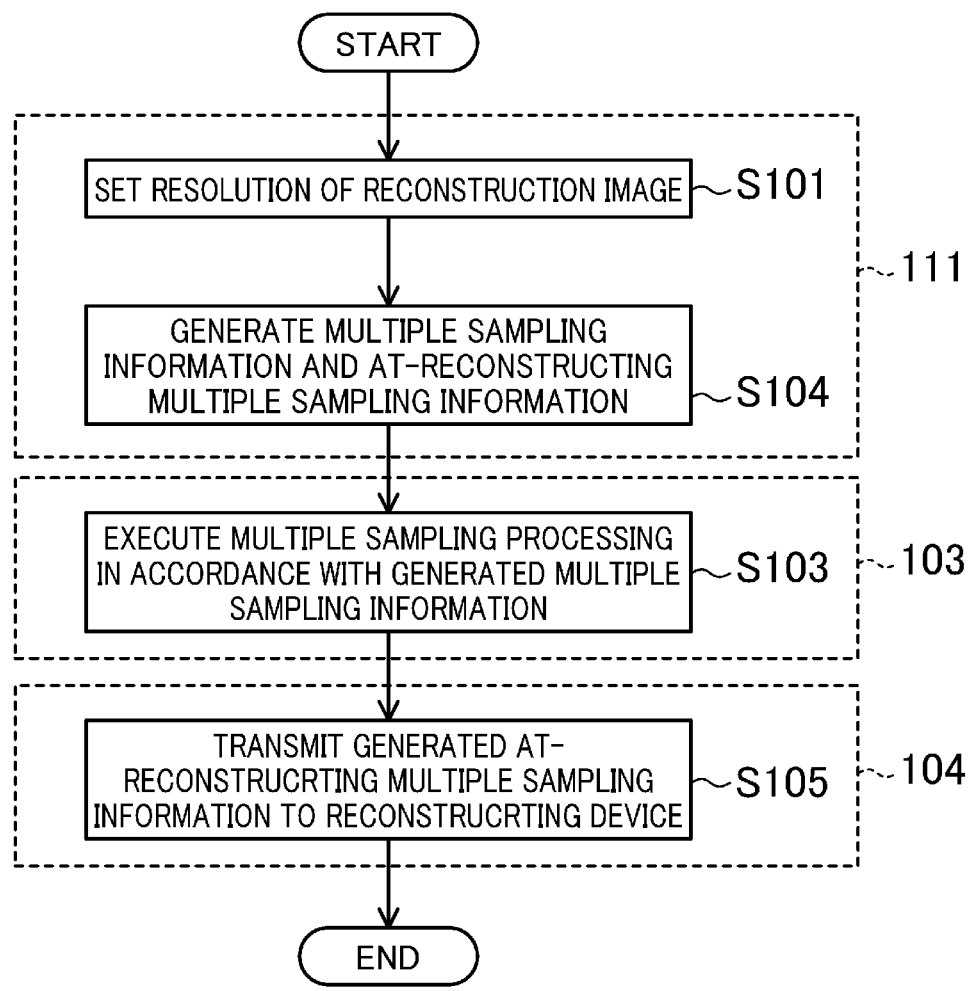
FIG. 16 is a flow chart illustrating another example of multiple sampling information setting processing performed in the configuration of FIG. 12.

Note that the multiple sampling information setting unit 111 may be configured such that the multiple sampling information used by the imaging device 11 for performing image capturing and the at-reconstructing multiple sampling information used by the reconstruction device 20 for performing image reconstruction are set separately. FIG. 16 is a flow chart illustrating an example of the above-described processing. In FIG. 16, each step common to FIG. 15 is denoted by the same reference character as that used in FIG. 15, and the detailed description will be omitted.

In Step S101, the user sets a desired resolution of a reconstruction image via the multiple sampling information setting unit 111.

In Step S104, the multiple sampling information setting unit 111 generates at-imaging multiple sampling information and at-reconstructing multiple sampling information by which an image is reconstructable at a desired resolution. For example, as the at-imaging multiple sampling information, information illustrating in FIGS. 7A to 7D may be generated and, as the at-reconstructing multiple sampling information, information illustrated in FIGS. 8A to 8D may be generated. In this case, the multiple sampling information setting unit 111 may hold, for example, a table indicating the corresponding relationship among a reconstructable resolution, the at-imaging multiple sampling information, and the at-reconstructing multiple sampling information.

In Step S103, the multiple sampling unit 103 performs multiple sampling processing in accordance with the at-imaging multiple sampling information set by the multiple sampling information setting unit 111.

In Step S105, the first communication unit 104 transmits the at-reconstructing multiple sampling information set by the multiple sampling information setting unit 111 to the reconstruction device 20.

The above-described processing enables the imaging system 2 to reconstruct an image at a resolution desired by the user.

Figure 17:
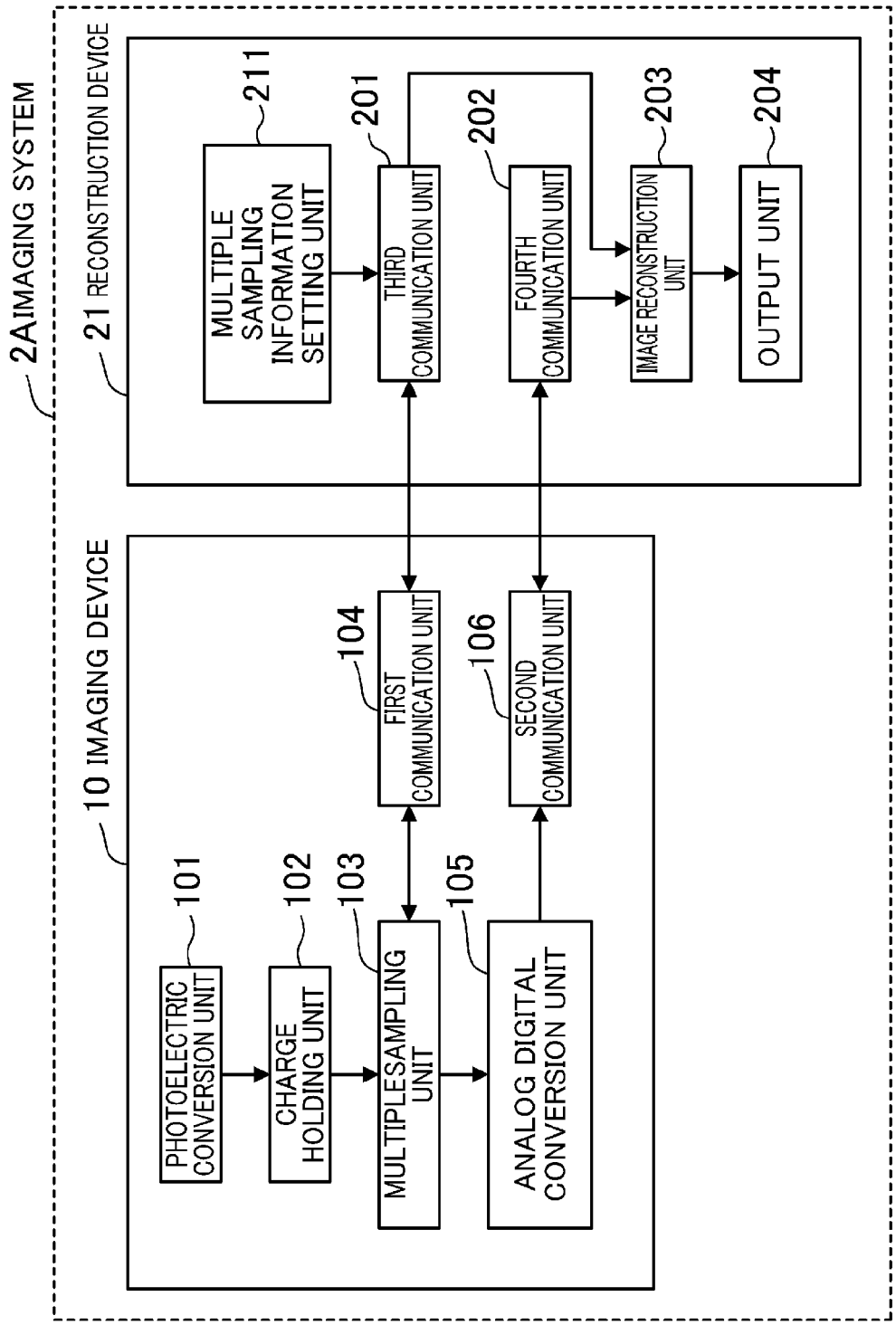
FIG. 17 is a block diagram illustrating another configuration of the imaging system according to the second embodiment.

Also, a multiple sampling information setting unit may be provided in a reconstruction device, instead being provided in an imaging device. FIG. 17 is a block diagram illustrating a configuration of the imaging system according to this embodiment. In FIG. 17, each component element common to FIG. 1 is denoted by the same reference character as that used in FIG. 1, and the detailed description will be omitted. An imaging system 2A includes the imaging device 10 and a reconstruction device 21 configured to reconstruct an image using a signal transmitted from the imaging device 10. The reconstruction device 21 includes, in addition to the component elements of the reconstruction device 20 of FIG. 1, a multiple sampling information setting unit 211.

The multiple sampling information setting unit 211 receives, for example, a designation of a desired resolution from a user. As an interface in this case, for example, a button, a touch panel, etc., may be used. The multiple sampling information setting unit 211 generates multiple sampling information in accordance with the designated resolution and gives the generated multiple sampling information to the third communication unit 201. In this case, the multiple sampling information setting unit 211 may hold, for example, a table indicating the corresponding relationship between a reconstructable resolution and multiple sampling information in advance. The multiple sampling unit 103 of the imaging device 10 executes multiple sampling processing on the basis of the multiple sampling information received by the first communication unit 104.

Also, the multiple sampling information setting unit 211 may be configured such that a resolution is not directly input by a user but is set, for example, in accordance with a life scene. For example, a resolution is set to be a "high resolution" when the user is "active," an "intermediate resolution" when the user is "absent from home," and a "low resolution" when the user is "asleep." Regarding an input of the life scene, for example, buttons of "active," "absent from home," and "asleep" may be installed in the imaging device 11 such that a user operates the buttons to execute the input. As another alternative, the life scene image may be comprehended by performing recognition processing using an image reconstructed by the reconstruction device 21.

Figure 18:
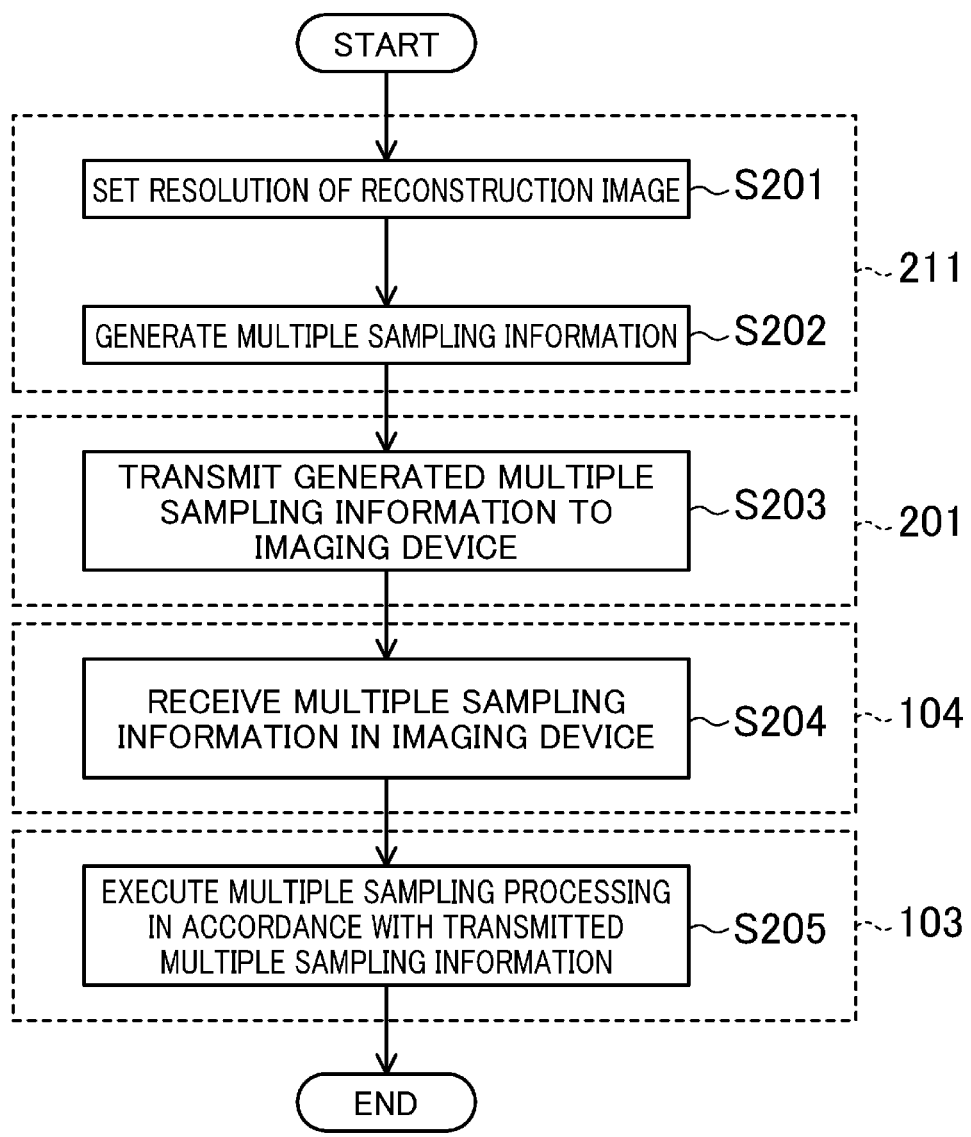
FIG. 18 is a flow chart illustrating an example of multiple sampling information setting processing performed in the configuration of FIG. 17.

FIG. 18 is a flow chart illustrating an example of multiple sampling information setting processing performed in the imaging system 2A of FIG. 17.

In Step S201, a user of the reconstruction device 21 sets a desired resolution of a reconstruction image via the multiple sampling information setting unit 211.

In Step S202, the multiple sampling information setting unit 211 generates multiple sampling information that is reconstructable at a desired resolution.

In Step S203, the third communication unit 201 of the reconstruction device 21 transmits multiple sampling information generated by the multiple sampling information setting unit 211 to the imaging device 10.

In Step S204, the first communication unit 104 of the imaging device 10 receives the transmitted multiple sampling information.

In Step S205, the multiple sampling unit 103 performs multiple sampling processing in accordance with the multiple sampling information received by the first communication unit 104.

As described above, according to this embodiment, a multiple sampling information setting unit is provided in an imaging device or a reconstruction device, so that a user may freely set the resolution of a reconstruction image. Thus, for example, when the user does not want to be imaged at a high resolution, a low resolution image may be reconstructed, and when the user wants to be imaged at a high resolution, a high resolution image may be reconstructed, and therefore, an imaging system that is excellent in privacy protection may be realized.

Similar to the first embodiment, in the imaging device 10 and the imaging device 11, the first communication unit 104 and the second communication unit 106 may be realized using the same communication unit. Similarly, in the reconstruction device 20 and the reconstruction device 21, the third communication unit 201 and the fourth communication unit 202 may be realized using the same communication unit.

Also, similar to the first embodiment, in the configuration of FIG. 12, the imaging device 11 and the reconstruction device 20 may store a plurality of types of multiple sampling information that are common for both of the imaging device 11 and the reconstruction device 20, and in the configuration of FIG. 17, the imaging device 10 and the reconstruction device 21 may store a plurality of types of multiple sampling information that are common for both of the imaging device 10 and the reconstruction device 21. In this case, in the configuration of FIG. 12, the imaging device 11 transmits information that specifies one of the plurality of types of multiple sampling information shared by the imaging device 11 and the reconstruction device 20, instead of multiple sampling information itself, to the reconstruction device 20.

Also, in the configuration of FIG. 17, the reconstruction device 21 transmits information that specifies one of the plurality of types of multiple sampling information shared by the imaging device 10 and the reconstruction device 21, instead of multiple sampling information itself, to the imaging device 10. Thus, the amount of communication may be greatly reduced.

(Third Embodiment)

Figure 19:
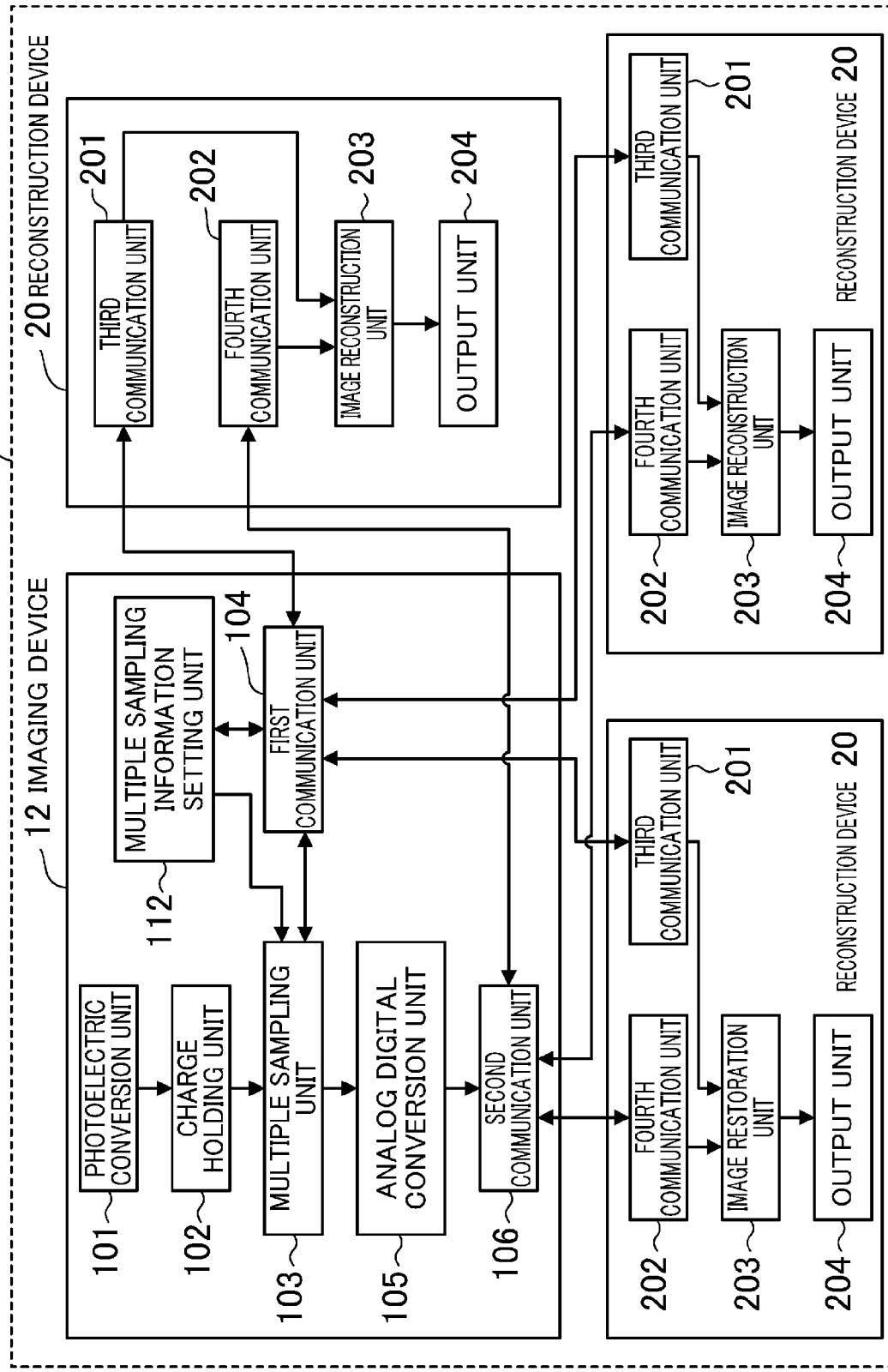
FIG. 19 is a block diagram illustrating a configuration of an imaging system according to a third embodiment.

FIG. 19 is a block diagram illustrating a configuration of an imaging system according to a third embodiment. In FIG. 19, each component element common to FIG. 12 is denoted by the same reference character as that used in FIG. 12, and the detailed description will be omitted.

In an imaging system 3 of FIG. 19, a multiple sampling information setting unit 112 in an imaging device 12 sets multiple sampling information that is used by the imaging device 12 for performing image capturing, and a plurality of pieces of at-reconstructing multiple sampling information that are to be used by the reconstruction device 20 for performing image reconstruction. The plurality of pieces of at-reconstructing multiple sampling information are, for example, multiple sampling information of a plurality of types, which correspond to different resolutions. The plurality of pieces of at-reconstructing multiple sampling information are transmitted to the plurality of reconstruction devices 20 via the first communication unit 104. In this case, the at-reconstructing multiple sampling information that is to be transmitted is one or multiple ones of the plurality of pieces of at-reconstructing multiple sampling information that have been set, and may differ for each reconstruction device 20. In the reconstruction device 20, image reconstruction processing is performed using received at-reconstructing multiple sampling information, and therefore, in the imaging system 3 according to this embodiment, an image signal having a different resolution may be reconstructed for each reconstruction device 20.

Figure 20:
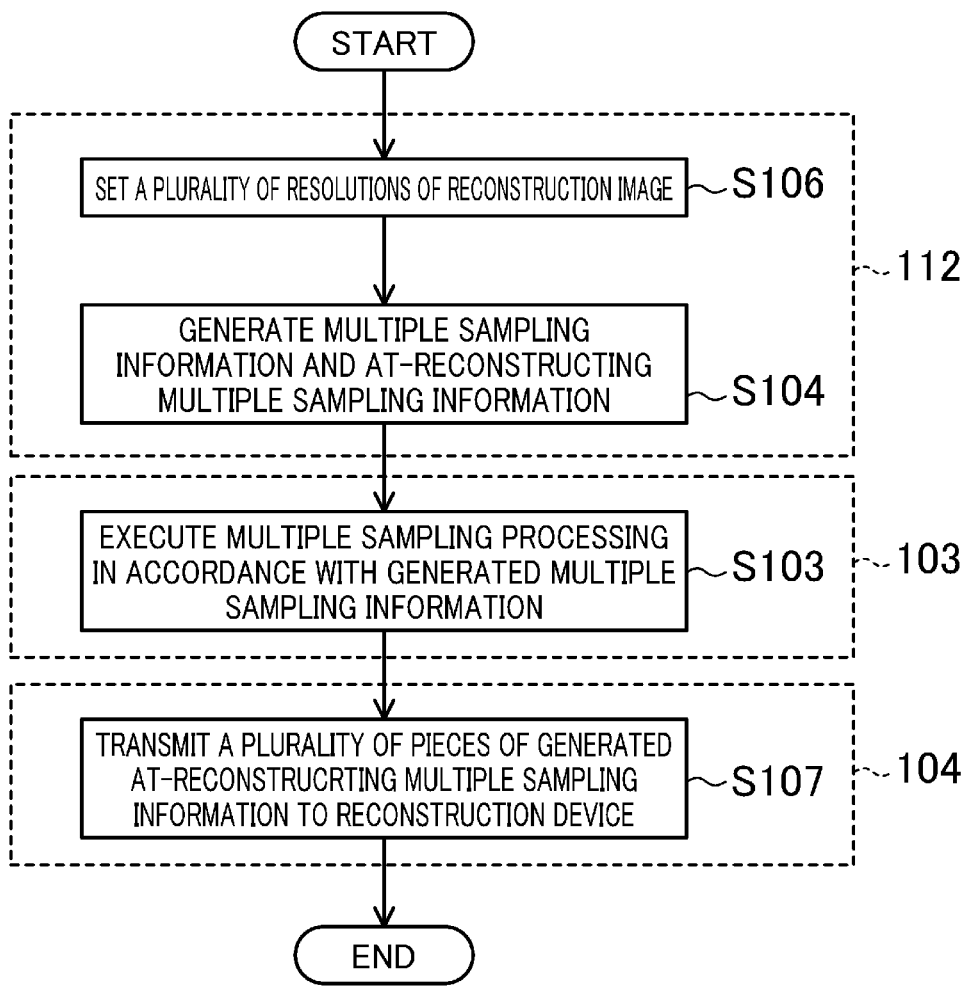
FIG. 20 is a flow chart illustrating an example of multiple sampling information setting processing performed in the configuration of FIG. 19.

FIG. 20 is a flow chart illustrating an example of multiple sampling information setting processing performed in the imaging system 3 according to this embodiment. In FIG. 20, each step common to FIG. 16 is denoted by the same reference character as that used in FIG. 16, and the detailed description will be omitted.

In Step S106, the multiple sampling information setting unit 112 sets pieces of multiple sampling information corresponding to the resolutions of a plurality of reconstruction images. For example, a plurality of assumed resolutions may set in a display, which is the output unit 204 of the reconstruction device 20. In Step S104, the multiple sampling information setting unit 112 generates at-imaging multiple sampling information and at-reconstructing multiple sampling information by which an image is reconstructable at a desired resolution. For example, as the at-imaging multiple sampling information, information illustrating in FIGS. 7A to 7D may be generated and, as the at-reconstructing multiple sampling information, information illustrated in FIGS. 8A to 8D may be generated. In this case, the multiple sampling information setting unit 112 may hold, for example, a table indicating the corresponding relationship among a reconstructable resolution, the at-imaging multiple sampling information, and the at-reconstructing multiple sampling information.

In Step S103, the multiple sampling unit 103 performs multiple sampling processing in accordance with the at-imaging multiple sampling information set by the multiple sampling information setting unit 112.

In Step S107, the first communication unit 104 transmits at least one of the plurality of pieces of at-reconstructing multiple sampling information set by the multiple sampling information setting unit 112 to the reconstruction device 20. Which at-reconstructing multiple sampling information is to be transmitted to the plurality of reconstruction devices 20 may be determined on the basis of the resolution of the display, which is the output unit 204 of the reconstruction device 20. That is, at-reconstructing multiple sampling information with which an image signal that is equivalent to the resolution of the display is reconstructed may be transmitted.

Figure 21:
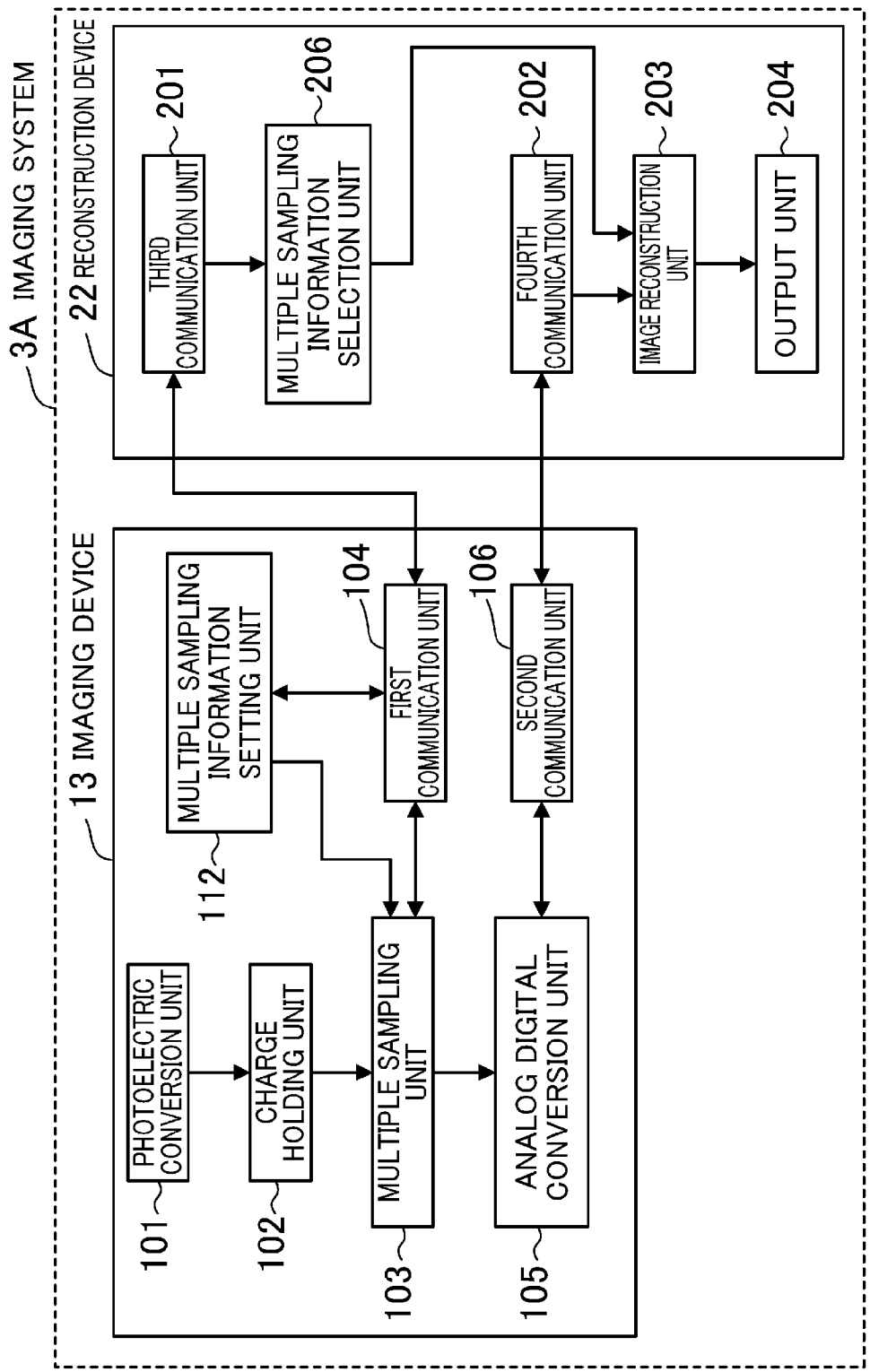
FIG. 21 is a block diagram illustrating another configuration of the imaging system according to the third embodiment.

FIG. 21 is a block diagram illustrating another configuration of the imaging system according to the third embodiment. In FIG. 21, each component element common to FIG. 19 is denoted by the same reference character as that used in FIG. 19, and the detailed description will be omitted.

In an imaging system 3A of FIG. 21, a reconstruction device 22 includes the third communication unit 201, the fourth communication unit 202, the image reconstruction unit 203, the output unit 204, and a multiple sampling information selection unit 206. An imaging device 13 does not transmit one of the plurality of pieces of at-reconstructing multiple sampling information that have been set by the multiple sampling information setting unit 112 to the reconstruction device 22, but transmits a plurality of pieces of at-reconstructing multiple sampling information to the reconstruction device 22. The reconstruction device 22 selects an optimal one from the plurality of pieces of at-reconstructing multiple sampling information that have been received by the third communication unit 201, and thus, an optimal image signal may be reconstructed in the output unit 204. This processing will be described in detail.

FIG. 22 is a flow chart illustrating an example of processing of the reconstruction device 22 in this embodiment.

In Step S207, the third communication unit 201 receives a plurality of pieces of at-reconstructing multiple sampling information.

In Step S208, the multiple sampling information selection unit 206 selects an optimal one from the plurality of pieces of at-reconstructing multiple sampling information that have been received by the third communication unit 201. For example, at-reconstructing multiple sampling information with which an image signal is reconstructed at a resolution desired by a user may be selected. For example, when the user doubles a display size on the display, at-reconstructing multiple sampling information with which an image signal is reconstructed at a resolution twice the original resolution is selected. Also, when the user reduces the display size on the display to ¼, at-reconstructing multiple sampling information with which an image signal is reconstructed at a resolution that is ¼ of the original resolution is selected.

In Step S209, the fourth communication unit 202 receives a digital signal transmitted from the second communication unit 106, for example, via a network.

In Step S210, the image reconstruction unit 203 performs reconstruction processing on the digital signal received by the fourth communication unit 202 using the multiple sampling information selected by the multiple sampling information selection unit 206, and obtains an image signal.

In Step S211, the output unit 204 displays an image reconstructed by the image reconstruction unit 203 on the display.

As described above, according to this embodiment, multiple sampling processing is performed in the imaging device 12 and the imaging device 13 before analog-digital conversion is performed, and the multiple sampling information is transmitted to the reconstruction device 20 and the reconstruction device 22. The multiple sampling information setting unit 112 sets a plurality of pieces of at-reconstructing multiple sampling information. Thus, the resolution of a reconstruction image signal may be changed in accordance with the resolution of the output unit 204 of each of the reconstruction device 20 and the reconstruction device 22 and an operation of a user. Thus, a desired image may be reconstructed in the reconstruction device 20 and the reconstruction device 22 without leaving a captured image in the imaging device 12 and the imaging device 13. Therefore, the imaging systems 3 and 3A that are excellent in privacy protection may be realized.

Note that, an imaging system described herein may not be realized as a device. For example, the above-described operation of an imaging system may be performed by causing a general-purpose processor that is a computer to execute a computer program recorded in a computer-readable recording medium. The computer program includes, for example, an order group that causes the computer to execute processing realized by the flow chart of FIG. 15. The computer program is recorded in a recording medium, such as a CD-ROM, etc., and is distributed as a product to the market, or is transmitted via an electric communication line, such as the Internet, etc.

An imaging system according to the present disclosure enables reconstruction of an image in a reconstruction device without leaving original image data in an imaging device. Accordingly, for example, in a household appliance, such as a TV, an air conditioner, a cleaning robot, etc., which includes an imaging device, excellent privacy protection may be realized.

What is claimed is:

1. An imaging device, comprising:
a photoelectric conversion unit that converts optical signals received by a plurality of pixels to electrical signals;
a charge holding unit that accumulates the electrical signals obtained by the photoelectric conversion unit and holds the accumulated signals as charge signals;
a multiple sampling unit that performs multiple sampling processing on the electrical signals held by the charge holding unit;
an analog digital conversion unit that converts an output signal of the multiple sampling unit to a digital signal; and
an imaging-side communication unit that transmits information regarding multiple sampling processing that is executed by the multiple sampling unit and the digital signal output from the analog digital conversion unit.

2. The imaging device of claim 1, wherein,
as the information regarding multiple sampling processing, multiple sampling information that is information indicating a sampling pixel position is transmitted.

3. The imaging device of claim 2, wherein
the multiple sampling information is information indicating multiple sampling processing that is executed by the multiple sampling unit.

4. The imaging device of claim 2, wherein
the multiple sampling information is information newly generated from information indicating multiple sampling processing that is executed by the multiple sampling unit such that an image signal having a lower resolution is obtained by reconstruction processing.

5. The imaging device of claim 4, wherein
the multiple sampling information is information obtained by performing sampling position change on the information indicating multiple sampling processing that is executed by the multiple sampling unit.

6. The imaging device of claim 4, wherein
a plurality of types of the multiple sampling information, which correspond to different resolutions, are generated and are transmitted.

7. The imaging device of claim 1, further comprising:
a reconstruction device that reconstructs an image using a signal transmitted from the imaging device, wherein:
the imaging device and the reconstruction device store common pieces of multiple sampling information of a plurality of types, and
the imaging device transmits, as information regarding the multiple sampling processing, information that specifies one of the pieces of multiple sampling information of a plurality of types to the reconstruction device.

8. The imaging device of claim 1, further comprising:
a setting unit that sets multiple sampling information,
wherein the multiple sampling unit performs multiple sampling processing in accordance with the multiple sampling information set by the setting unit.

9. A reconstruction device which performs image reconstruction using a signal transmitted from the imaging device of claim 1, comprising:
a reconstruction-side communication unit that receives information regarding the multiple sampling processing and the digital signal which are transmitted from the imaging-side communication unit of the imaging device;
an image reconstruction unit that performs reconstruction processing on the digital signal received by the reconstruction-side communication unit using the information regarding the multiple sampling processing received by the reconstruction-side communication unit, and obtains an image signal; and
an output unit that outputs the image signal reconstructed by the image reconstruction unit.

10. An imaging system, comprising:
an imaging device; and
a reconstruction device configured to reconstruct an image using a signal transmitted from the imaging device,
wherein
the imaging device includes
a photoelectric conversion unit configured to convert optical signals received by a plurality of pixels to electrical signals,
a charge holding unit configured to accumulate the electrical signals obtained by the photoelectric conversion unit and hold the accumulated signals as charge signals,
a multiple sampling unit configured to perform multiple sampling processing on the electrical signals held by the charge holding unit,
an analog digital conversion unit configured to convert an output signal of the multiple sampling unit to a digital signal, and
an imaging-side communication unit configured to transmit information regarding multiple sampling processing that is executed by the multiple sampling unit and the digital signal output from the analog digital conversion unit, and
the reconstruction device includes
a reconstruction-side communication unit configured to receive information regarding the multiple sampling processing and the digital signal which are transmitted from the imaging-side communication unit of the imaging device, an image reconstruction unit configured to perform reconstruction processing on the digital signal received by the reconstruction-side communication unit using the information regarding the multiple sampling processing received by the reconstruction-side communication unit, and obtain an image signal, and an output unit configured to output the image signal reconstructed by the image reconstruction unit.

11. The imaging system of claim 10, wherein the reconstruction device includes a setting unit configured to set multiple sampling information, the reconstruction-side communication unit is configured to transmit the multiple sampling information set by the setting unit to the imaging device, and in the imaging device, the imaging-side communication unit receives the multiple sampling information transmitted from the reconstruction-side communication unit of the reconstruction device, and the multiple sampling unit performs multiple sampling processing in accordance with the multiple sampling information received by the imaging-side communication unit.

12. The imaging system of claim 10, wherein the imaging system includes a plurality of the reconstruction devices, and the imaging device generates a plurality of pieces of multiple sampling information that is information indicating a sampling image position from information indicating multiple sampling processing that is executed by the multiple sampling unit, and transmits, as the information regarding multiple sampling processing, at least one of the plurality of pieces of multiple sampling information, which have been generated, to each of the plurality of the reconstruction devices.

13. The imaging system of claim 10, wherein the imaging device generates a plurality of pieces of multiple sampling information that is information indicating a sampling image position from information indicating multiple sampling processing that is executed by the multiple sampling unit, and transmits, as the information regarding multiple sampling processing, the plurality of pieces of multiple sampling information, which have been generated, to the reconstruction devices, and the reconstruction device selects one of the plurality of pieces of multiple sampling information, which have been received, and performs reconstruction processing using the selected multiple sampling information.

14. An imaging method performed in an imaging system including an imaging device and a reconstruction device which performs image reconstruction using a signal transmitted from the imaging device, the imaging method comprising:

holding by the imaging device a charge signal of a captured image;

performing by the imaging device multiple sampling processing on the held charge signal;

converting by the imaging device a signal that has undergone the multiple sampling processing to a digital signal;

transmitting by the imaging device information regarding the multiple sampling processing and the digital signal to the reconstruction device;

receiving by the reconstruction device the information regarding the multiple sampling processing and the digital signal which are transmitted from the imaging device;

performing by the reconstruction device reconstruction processing on the digital signal using the information regarding the multiple sampling processing to obtain an image signal; and outputting by the reconstruction device the reconstructed image signal.

* * * * *